(12) United States Patent
Tu et al.

(10) Patent No.: US 12,380,104 B2
(45) Date of Patent: Aug. 5, 2025

(54) BATCHED QUERY PROCESSING AND OPTIMIZATION

(71) Applicant: University of South Florida, Tampa, FL (US)

(72) Inventors: Yicheng Tu, Tampa, FL (US); Mehrad Eslami, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 103 days.

(21) Appl. No.: 17/601,048

(22) PCT Filed: Apr. 3, 2020

(86) PCT No.: PCT/US2020/026624
§ 371 (c)(1),
(2) Date: Oct. 1, 2021

(87) PCT Pub. No.: WO2020/206288
PCT Pub. Date: Oct. 8, 2020

(65) Prior Publication Data
US 2022/0222256 A1    Jul. 14, 2022

Related U.S. Application Data

(60) Provisional application No. 62/828,834, filed on Apr. 3, 2019.

(51) Int. Cl.
*G06F 16/2453* (2019.01)
*G06F 11/34* (2006.01)
*G06F 16/22* (2019.01)

(52) U.S. Cl.
CPC .... *G06F 16/24544* (2019.01); *G06F 11/3409* (2013.01); *G06F 16/2282* (2019.01); *G06F 16/24539* (2019.01)

(58) Field of Classification Search
CPC .................. G06F 16/24544; G06F 16/24539
USPC .......................................................... 707/713
See application file for complete search history.

(56) References Cited

U.S. PATENT DOCUMENTS

| | | | |
|---|---|---|---|
| 6,032,144 | A | 2/2000 | Sirvastava et al. |
| 6,275,818 | B1 * | 8/2001 | Subramanian ...... G06F 16/2454 |
| 6,748,392 | B1 | 6/2004 | Galindo-Legaria et al. |
| 9,020,908 | B2 | 4/2015 | Danielson et al. |
| 10,191,943 | B2 | 1/2019 | Simhadri et al. |

(Continued)

OTHER PUBLICATIONS

Agarwal et al., "BlinkDB: Queries with Bounded Errors and Bounded Response Times on Very Large Data," In Proceedings of the 8th ACM European Conference on Computer Systems (EuroSys '13). ACM, New York, Ny, USA, 2013, pp. 29-42.

(Continued)

*Primary Examiner* — Muluemebet Gurmu
(74) *Attorney, Agent, or Firm* — Quarles & Brady LLP

(57) ABSTRACT

Disclosed are various embodiments for batched query processing and optimization in database management systems. A single algebraic expression is generated based at least in part on applying equivalence rules to algebraic expressions for a plurality of database queries of a database comprising a set of relations. The equivalence rules involve relational operators comprising Psi (ψ) operators. The database can be queried using a single database query to create a result that is equivalent to the plurality of database queries.

14 Claims, 14 Drawing Sheets

(56) References Cited

U.S. PATENT DOCUMENTS

| | | | | |
|---|---|---|---|---|
| 11,210,296 | B2* | 12/2021 | Shah | G06F 16/2255 |
| 2001/0013038 | A1* | 8/2001 | Purcell | G06F 16/2471 |
| 2005/0119988 | A1* | 6/2005 | Buch | G06F 9/5027 |
| 2006/0031224 | A1* | 2/2006 | Haugh | G06F 16/2471 |
| 2006/0206512 | A1* | 9/2006 | Hanrahan | G06T 11/206 |
| | | | | 707/999.102 |
| 2011/0055199 | A1 | 3/2011 | Siddequie et al. | |
| 2013/0006968 | A1* | 1/2013 | Gusmini | G06F 16/25 |
| | | | | 707/E17.014 |
| 2015/0074034 | A1* | 3/2015 | Ait-Mohktar | G06F 16/835 |
| | | | | 706/50 |
| 2016/0147878 | A1* | 5/2016 | Mañá | G06F 16/3344 |
| | | | | 707/706 |
| 2017/0046391 | A1* | 2/2017 | Pestana | G06F 16/24522 |
| 2022/0222256 | A1* | 7/2022 | Tu | G06F 11/3409 |

OTHER PUBLICATIONS

Arumugam et al., "The DataPath System: A Data-centric Analytic Processing Engine for Large Data Warehouses," n Proceedings of the 2010 ACM SIGMOD International Conference on Management of Data (SIGMOD '10). ACM, New York, NY, USA, 2010, pp. 519-530.

Boncz et al., "MonetDB/XQuery: A Fast XQuery Processor Powered by a Relational Engine," In Proceedings of the 2006 ACM SIGMOD International Conference on Management of Data (SIGMOD '06). ACM, New York, NY, USA, 2006, pp. 479-490.

Candea et al., "A Scalable, Predictable Join Operator for Highly Concurrent Data Warehouses," Proceedings of the 35th International Conference on Very Large Data Bases (VLDB). No. CONF. 2009, pp. 277-288.

Codd, E.F., "A Relational Model of Data for Large Shared Data Banks," Communications of the ACM 13.6 1970, pp. 377-387.

Dalvi et al., "Pipelining in Multi-query Optimization," Proceedings of the twentieth ACM SIGMOD-SIGACT-SIGART symposium on Principles of database systems. (PODS '01 ). ACM, New York, NY, USA, 2001, pp. 59-70.

Finkelstein, S., "Common Expression Analysis in Database Applications," In Proceedings of the 1982 ACM SIGMOD International Conference on Management of Data (1982) (SIGMOD '82). ACM, New York, NY, USA, 1982, pp. 235-245.

Giannikis et al., "SharedDB: Killing One Thousand Queries with One Stone," arXiv preprint arXiv:1203.0056, 2012, pp. 526-537.

Giannikis et al., "Shared Workload Optimization," Proceedings of the VLDB Endowment 7.6, 2014, pp. 429-440.

Giannikis et al., "Workload Optimization Using SharedDB," In Proceedings of the 2013 ACM SIGMOD International Conference on Management of Data (SIGMOD '13). ACM, New York, NY, USA, 2013, pp. 1045-1048.

Giannikis et al., "Crescando," In Proceedings of the 2010 ACM SIGMOD International Conference on Management of Data (SIGMOD '10). ACM, New York, NY, USA, 2010, pp. 1227-1230.

Harinarayan et al., In Proceedings of the 1996 ACM SIGMOD International Conference on Management of Data (SIGMOD '96). ACM, New York, NY, USA, 1996, pp. 205-216.

Harizopoulos et al., "QPipe: A Simultaneously Pipelined Relational Query Engine," Proceedings of the 2005 ACM SIGMOD international conference on Management of data, (SIGMOD '05). ACM, New York, NY, USA, 2005, pp. 383-394.

Kester et al., "Access Path Selection in Main-Memory Optimized Data Systems: Should I Scan or Should I Probe?" In Proceedings of the 2017 ACM International Conference on Management of Data (SIGMOD '17). ACM, New York, NY, USA, 2017, pp. 715-730.

Makreshanski et al., "MQJoin: Efficient Shared Execution of Main-Memory Joins," ETH Zurich, 2016.

Nicola, M., Jarke, M., "Performance Modeling of Distributed and Replicated Databases," IEEE Transactions on Knowledge and Data Engineering 12.4, 2000, pp. 645-672.

Saikia et al., "Comparative Performance Analysis of MySQL and SQL Server Relational Database Management Systems in Windows Environment," International Journal of Advanced Research in Computer and Communication Engineering, 4.3, 2015, pp. 160-164.

Sellis, T., Ghosh, S., "On the multiple-query optimization problem," IEEE Transactions on Knowledge and Data Engineering 2.02, 1990, pp. 262-266.

Bellis, T., "Multiple-query Optimization," ACM Transactions on Database Systems (TODS) 13.1, 1988, pp. 23-52.

2017. Database Page Layout, PostgreSQL 10 documentation. https://www.postgresql.org/docs/10/static/storage-page-layout.html, on Oct. 10, 2022, 3 pages.

2017. Field Contents, MySQL Internals Manual. https://www.postgresql.org/docs/10/static/storage-page-layout.html, on Oct. 10, 2022, 3 pages.

* cited by examiner

| | | |
|---|---|---|
| $i$ | $T_1T_2T_3$ | ①$+\wedge$②$+\wedge$③$+$ |
| $ii$ | $T_1T_2\omega_3$ | ①$+\wedge$②$-$ |
| $iii$ | $\omega_1T_2\omega_3$ | ①$-\wedge$②$-$ |
| $iv$ | $\omega_1T_2T_3$ | ②$+\wedge$(①$-\vee$③$-$) |

| | | |
|---|---|---|
| $i'$ | $T_1T_2T_3$ | ①$+\wedge$②$+\wedge$③$+$ |
| $ii'$ | $T_1T_2\omega_3$ | ①$+\wedge$(②$-\vee$③$-$) |
| $iii'$ | $\omega_1T_2\omega_3$ | ①$-\wedge$②$-$ |
| $iv'$ | $\omega_1T_2T_3$ | ①$-\wedge$②$+$ |

FIG. 7

BATCHED QUERY PROCESSING AND OPTIMIZATION

CROSS-REFERENCE TO RELATED APPLICATION

This application is a national stage filing under 35 U.S.C. § 371 of International Application No. PCT/US2020/026624, filed Apr. 3, 2020, which claims priority to and the benefit of, U.S. Provisional Application No. 62/828,834, filed on Apr. 3, 2019, entitled "BATCHED QUERY PROCESSING AND OPTIMIZATION," the entire contents of each are hereby incorporated herein by reference.

GOVERNMENT LICENSE RIGHTS

This invention was made with government support under project U.S. Pat. No. 1,253,980 awarded by National Science Foundation. The government has certain rights in the invention.

BACKGROUND

Conventional query processing for database management systems (DBMSs) can follow a one-query-at-a-time query processing model, in which queries in a workload are optimized and executed largely in an independent manner. Design of some DBMSs provide that query results should be combined together using the union (U) operator resulting in systems that exclude operands that are not union compatible. New approaches are needed that can cover optimization techniques adopted in existing batch processing systems while providing for new optimization opportunities.

SUMMARY

A system can include a database and a computing device in communication with the database. The computing device can be configured to obtain a plurality of database queries, generate a single expression based at least in part on the plurality of database queries, and query the database based on the single expression to return a global relation corresponding to relations for the plurality of database queries.

A method can include obtaining, via a computing device, a plurality of database queries. The method can also include generating, via the computing device, a single expression based on the plurality of database queries, and querying, via the computing device, a database based at least in part on the single expression.

A system can include a data store comprising a set of relations, and a computing device that is in communication with the data store. The computing device can be configured to obtain a plurality of database queries associated with the set of relations, with each the relations comprising attributes. The computing device can be further configured to generate, based at least in part on the set of relations, a single algebraic expression whose result is a global relation comprising a set of tuples, and provide each tuple in the global relation to a plurality of filters to generate output relations corresponding to the plurality of database queries.

BRIEF DESCRIPTION OF THE DRAWINGS

For a more complete understanding of the embodiments and the advantages thereof, reference is now made to the following description, in conjunction with the accompanying figures briefly described as follows:

FIG. 7 shows components needed for recovering table $T_2$ from the two resulting tables shown in FIG. 6 according to various embodiments of the present disclosure.

Figure 1:
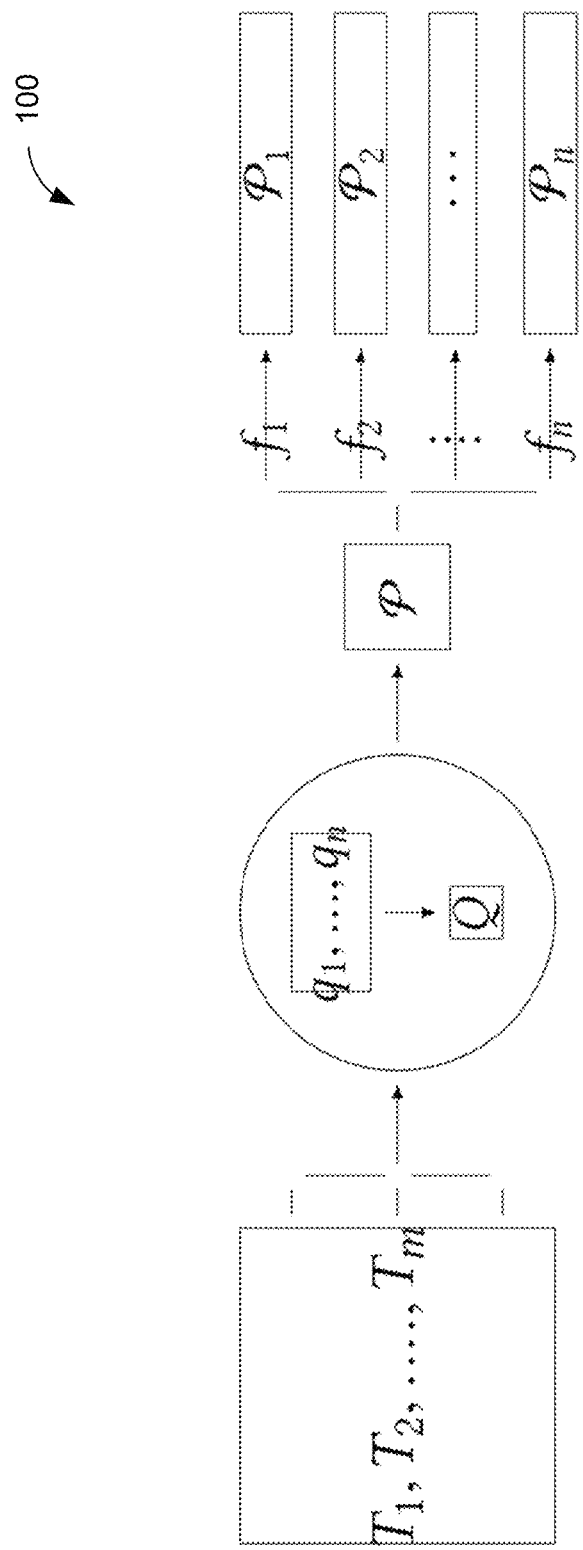
FIG. 1 is a diagram of a query processing system model with $T_1$, $T_2$, ..., Tm being input relations and $P_1$, $P_2$, ..., $P_n$ being output relations according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "workstation" are not limited to a device with a single processor, but may encompass multiple devices (e.g., computers) linked in a system, devices with multiple processors, special purpose devices, devices with various peripherals and input and output devices, software acting as a computer or server, and combinations of the above.

Systems and methods are discussed herein that include generating a single expression that corresponds to a set of database queries. The single expression includes a set of relations containing all of the data necessary for the set of database queries. Equivalence rules can be applied to algebraic expressions to convert the set of database queries into a single expression. A computing device can receive the set of database queries from one or more computing devices. The database can be queried using the single expression. If the database is modified, a single expression can still be generated for sets of database queries. This is due to the use of equivalence rules and algebraic expressions.

Techniques based on sharing data and computation among queries have been an active research topic in database systems. While work in this area developed algorithms and systems that have shown to be effective, there is a lack of logical foundation for query processing and optimization. This disclosure presents a system model for processing a large number of database queries in a batch. One example of the system model or system is referred to herein as PsiDB. A key idea is to generate a single query expression that returns a global relation containing all of the data needed for individual queries. For that, use of a group of relational operators called ii-operators is proposed. The ii-operators can be used to combine the individual queries into the global expression and study their features. The algebraic optimization problem in the system is tackled by developing equivalence rules to transform concurrent queries with the purpose of revealing query optimization opportunities. Centering around the ψ-operator, the disclosed rules cover many optimization techniques adopted in existing batch processing systems, and reveal new optimization opportunities. Also, a vision for the development of a query optimizer following the disclosed strategy is presented. Experiments conducted on the system showed a performance improvement of up to 36× the performance over a mainstream commercial DBMS.

Traditional database management systems (DBMSs) follow a one-query-at-a-time query processing model, in which queries in a workload are optimized and executed largely in an independent manner. Today's database systems often need to serve a multitude of user queries in a short period of time. For example, in a typical Online Analytical Processing (OLAP) system it can be desirable to process a workload at the 10,000 query per second (qps) level or above. Under such high demand, the one-query-at-a-time model falls short in meeting performance requirements because it can easily lead to resource contentions. On the other hand, the database community observed that queries in a workload may have a significant overlap in the data access paths and intermediate query results. Plausible efforts to harness computation and data access sharing among concurrent queries have been reported. This disclosure refers to the many flavors of such work as concurrent database management systems (CDBMS), although the present disclosure is not necessarily limited to CDBMS.

In CDBMS's, a main task in query optimization is essentially to find a global execution plan that combines the necessary computations to derive the results of multiple concurrent queries with the smallest resource consumption. With query optimization in traditional DBMSs already a very challenging problem, the involvement of multiple queries in CDBMSs adds extra difficulties. Therefore, related work in this field has focused on heuristics or rules to locate viable plans or sub-plans for query processing. CDBMS systems are shown to significantly outperform traditional relational database management systems (RDBMSs) in both throughput and query response time. While such work developed effective algorithms and systems, there is a lack of theoretical foundation for CDBMS query optimization. In particular, existing methodologies involve developing rules for physical plan generation and selection, without considering the representation and transformation of the queries at the logical level. As a result, such systems can work well for workloads with a fixed query pattern.

Algebraic representation of queries is often seen as the first step toward query optimization. Following that, equivalence rules are used to transform the initial algebraic expression into others that also return the same results. Such rules are essential in deriving a rich set of query plans with different performance profiles to choose the next steps in query optimization. In this disclosure, it is argued that the rules adopted in traditional DBMSs are insufficient to capture optimization opportunities in current query processing. One problem is that an algebraic expression, taking a set of relations as input, returns a single relation in traditional RDBMSs, however, in CDBMSs it returns multiple relations.

A system for query processing in CDBMSs is presented. The key idea is to generate a single query expression that returns a global relation containing all the data needed for individual queries. This disclosure studies the features of a group of relational operators called ψ-operators for gluing the individual queries into the global expression.

Equivalence rules to transform algebraic expressions within the system framework are developed. Centering around the ψ-operator, the disclosed rules not only cover many optimization techniques adopted in existing CDBMSs, but also reveal new optimization opportunities.

This disclosure introduces a system model (also referred to herein as a framework or the PsiDB Framework) for concurrent query processing including all the definitions and terminology that are used throughout the disclosure. Key differences between some conventional CDBMSs, such as DataPath and ShareDB, are also highlighted below. ShareDB is sometimes referred to as SharedDB.

Multi-Query-One-Execution Model. A traditional RDBMS processes one query at a time and returns a relation as the query result. The query processor of a DBMS needs to transform a query written in a declarative language such as Structured Query Language (SQL) to a relational algebraic representation for further consideration in the query optimization stage. The same relational algebraic representation is needed for CDBMSs, the major difference is that there are more than one query to be executed at a time. The present disclosure is useful for CDBMS systems that organize queries into batches and each batch consists of all queries that arrive during a period of time. Let us first define notations to set up the theoretical framework.

Definition 1. A table schema R is a set of attributes, each of which defines a domain of values. A relation (e.g., table) r comprises a set of tuples (e.g., rows), each tuple t (denoted as $t \in r$) has value following the schema R.

Definition 2. A query $q_i$ is a relational algebraic expression over a set of relations, and the result of a query is also a relation. The set $q=\{q_1, q_2, \ldots, q_n\}$ indicates the list of registered queries in the system to be executed concurrently.

Definition 3. An attribute is a column of a relation and is denoted as $A_k$. The resulting relation of query $q_i$ contains a set of attributes $L_i=\{A_1, A_2, \ldots, A_k\}$. Define a global attribute set containing all attributes in the resulting relations of all the n queries as $L_q = L_1 \cup L_2 \ldots \cup L_n$.

A database contains a set of relations $\mathbb{T}=\{T_1, T_2, \ldots, T_m\}$, each of which contains different attributes. Each query will take one or a combination of such relations as inputs. As in many relational algebraic studies, one can assume the relations in T are designed following at least the 1st Normal Form.

Example 1. An example database is presented along with a few queries to be used for examples throughout the disclosure. The database consists of three tables: Part, PartSupp and Supplier. They are referred to hereafter as P, PS and S, respectively.

There exists the following foreign keys: PS.pkey→P.pkey and PS.skey→S.skey, and (pkey, skey) serves as the primary key of PS. The query workload consists of five queries shown in Table 2 below.

In a CDBMS, an expression returns a vector of relations (vs. one single relation in RDBMS) as output. However, the existence of multiple output relations makes mathematical reasoning difficult, as one may need to combine all the single query expressions into one. One approach is to introduce a global relation $\mathcal{P}$, which is a single relation that contains all the data needed to derive the final results for all queries in the workload. Therefore, a goal is to transform the individual queries (e.g., expressions) $q_1, q_2, \ldots, q_n$ into a single algebraic expression Q whose resulting relation is $\mathcal{P}$. Each tuple in $\mathcal{P}$ will be distributed to filter functions that belong to individual queries to generate the final result for the latter.

Turning now to the drawings, exemplary embodiments are described in detail. With reference to FIG. 1, shown is an example design of a system 100 according to various example embodiments. FIG. 1 is a diagram of a system 100 for concurrent query processing. The system 100 is also referred to herein as PsiDB or the PsiDB system model. The system 100 can include a data store or database comprising a plurality of relations, with $T_1, T_2, \ldots, T_m$ being input relations and P1, P2, ..., Pn being output relations. Key components of the system 100 are as follows.

TABLE 1

Database Schema a) PART

| PREY | NAME | MFGR | RETPRICE |
|---|---|---|---|
| 1 | part1 | mf1 | 100 |
| 2 | part2 | mf1 | 10 |
| 3 | part3 | mf1 | 10 |
| 4 | part4 | mf1 | 40 |
| 5 | part5 | mf2 | 30 | b) SUPPLIER

| SKEY | NAME | STATE | PHONE |
|---|---|---|---|
| 1 | sup1 | CA | (562) 111-1111 |
| 2 | sup2 | FL | (813) 111-1111 |
| 3 | sup3 | TX | (214) 111-1111 |
| 4 | sup4 | FL | (813) 222-2222 | c) PARTSUPP

| PKEY | SKEY | AVLQTY | SUPPRICE |
|---|---|---|---|
| 1 | 1 | 10 | 110 |
| 1 | 2 | 5 | 90 |
| 2 | 1 | 0 | 12 |
| 2 | 2 | 0 | 8 |
| 2 | 3 | 0 | 12 |
| 3 | 1 | 5 | 9 |
| 3 | 2 | 10 | 8 |
| 4 | 1 | 10 | 40 |
| 4 | 2 | 0 | 40 |
| 4 | 3 | 12 | 40 |

TABLE 2

Queries in sample workload

| | |
|---|---|
| $q_1$ | SELECT pkey, P.name, retprice<br>FROM part P WHERE retprice < 40 |
| $q_2$ | SELECT pkey, retprice, supprice<br>FROM part P JOIN partsupp PS JOIN supplier s<br>ON P.pkey = PS.pkey AND S.skey = PS.skey<br>where supprice < retprice AND avlqty < 40 |
| $q_3$ | SELECT pkey, skey, retprice, supprice, S.name<br>FROM part P JOIN partsupp PS JOIN supplier s<br>ON P.key = PS.pkey AND S.skey = PS.skey<br>WHERE supprice < retprice AND avlqty < 0 |
| $q_4$ | SELECT skey.supprice.state<br>FROM part P JOIN partsupp PS JOIN supplier S<br>ON P.key = PS.pkey AND S.skey = PS.skey<br>WHERE supprice < retprice AND state = FL |
| $q_5$ | SELECT skey.pkey.state FROM supplier S<br>JOIN partsupp PS ON S.skey = PS.skey WHERE state = FL |

Combining Multiple Relations

With the concept of a global relation $\mathcal{P}$, it is necessary to develop an approach to combine results of individual relational expressions into $\mathcal{P}$. Specifically, one can define a binary relational operator for such purposes. Intuitively, such an operator: (i) should generate a global output relation $\mathcal{P}$ that contains all the data of the operands; (ii) one can apply a filtering function to recover the exact individual operands; (iii) Furthermore, to apply the operation to a series of operands, the order of such sequence should not change the recoverability of all operands from $\mathcal{P}$. It turns out more than one relational operators satisfy such conditions. Let us first formalize the definition of such operators.

Definition 4. Given a binary relational operator $\odot$ and for $\odot = T_1 \odot T_2$, the operator is a $\psi$-family operator (or simply $\psi$-operator) if all of the following conditions are satisfied:

(i) Operand Recoverability: There exist relational algebraic functions $f_1$ and $f_2$ to recover the two input tables $T_1$ and $T_2$ exactly from $\mathcal{P}$, e.g., one must have $T_1 = f_1(\mathcal{P})$ and $T_2 = f_2(\mathcal{P})$;

(ii) Weak Commutativity: Given $\mathcal{P}' = T_2 \odot T_1$, one can use the same functions $f_1$ and $f_2$ to recover $T_1$ and $T_2$ from $\mathcal{P}'$, e.g., $T_1 = f_1(\mathcal{P}')$ and $T_2 = f_2(\mathcal{P}')$;

(iii) Weak-Associativity: The same functions $f_1$, $f_2$, and $f_3$ can be used to exactly recover $T_1$, $T_2$, $T_3$ from $\mathcal{P} = T_1 \odot (T_2 \odot T_3)$ and also from $\mathcal{P}' = (T_1 \odot T_2) \odot T_3$.

Note that the common concepts of commutativity (e.g., $T_1 \odot T_2 = T_2 \odot T_1$) and associativity (e.g., $T_1 \odot (T_2 \odot T_3) = (T_1 \odot T_2) \odot T_3$) are strong forms of conditions (ii) and (iii), respectively. In other words, when one reorders the sequence of operands of the $\psi$-operator, a unique global relation is not required. Instead, some embodiments of this disclosure require that the same filter functions can be used to generate the original relations. Now individual members of the $\psi$-family are studied.

Theorem 1. A Cartesian (or cross) product between two nonempty relations $T_1$ and $T_2$, defined as $$T_1 \times T_2 = \{\langle t_1, t_2 \rangle | \forall t_1 \in T_1 \land \forall t_2 \in T_2\}$$

is a $\psi$-operator.

Proof. Operand Recoverability: suppose $T_1 \times T_2 = \mathcal{P}$ and $L_{T_1}$, $L_{T_2}$ are the set of attributes for relations $T_1$ and $T_2$, respectively. The exact input relations of the product operator can be easily recovered from T as $$T_1 = \prod_{L_{T_1}}(\mathcal{P}), \quad T_2 = \prod_{L_{T_2}}(\mathcal{P}) \qquad (1)$$

Commutativity and Associativity: It is easy to see that cross product is (strong) commutative and (strong) associative.

Another example $\psi$-operator involves the concept of outer join. Let us first start with some definitions.

Definition 5. Selection condition $\theta$ on a relation r compares two atomic values of $\theta = A_i \phi A_j$ or $\theta = A_i \phi e$ where $\phi = \{<, =, \neq, >, \text{in}\}$ and e is a valid value for the attribute $A_i$.

Definition 6. A selection operation over a relation r is to apply a set of conditions as follows: $\sigma_\theta(r) = \{t | t \in r \land \theta(t) = \text{TRUE}\}$.

Definition 7. The (inner) join between two relations by a common condition c is $$T_1 \bowtie_c T_2 = \sigma_c(T_1 \times T_2).$$

Definition 8. A left outer join between two relations is denoted as $T_1 \bowtie_c T_2$ where c is the join condition. Let $L_{T_1}$ be the attribute list of table $T_1$ and let $\omega_2 = \{(\text{null}, \ldots, \text{null})\}$ be the singleton on all attributes of $T_2$, the left outer join can be described as follows:

$$T_1 \bowtie_c T_2 = (T_1 \bowtie_c T_2) \cup \left(\left(T_1 - \Pi_{L_{T_1}}(T_1 \bowtie_c T_2)\right) \times \omega_2\right).$$

Similarly, the right outer join can be defined as:

$$T_1 \stackrel{\bowtie}{c}_c T_2 = (T_1 \stackrel{\bowtie}{c}_c T_2) \cup (T_1 \stackrel{\bowtie}{c}_c T_2).$$

Definition 9. A full outer join is a union between both left and right outer join (definition 8) on the same relations:

$$T_1 \stackrel{\bowtie}{c}_c T_2 = (T_1 \stackrel{\bowtie}{c}_c T_2) \cup (T_1 \stackrel{\bowtie}{c}_c T_2).$$

Theorem 2. The full outer join ($\triangleright\triangleleft$) is a $\psi$-operator.

Figure 2:
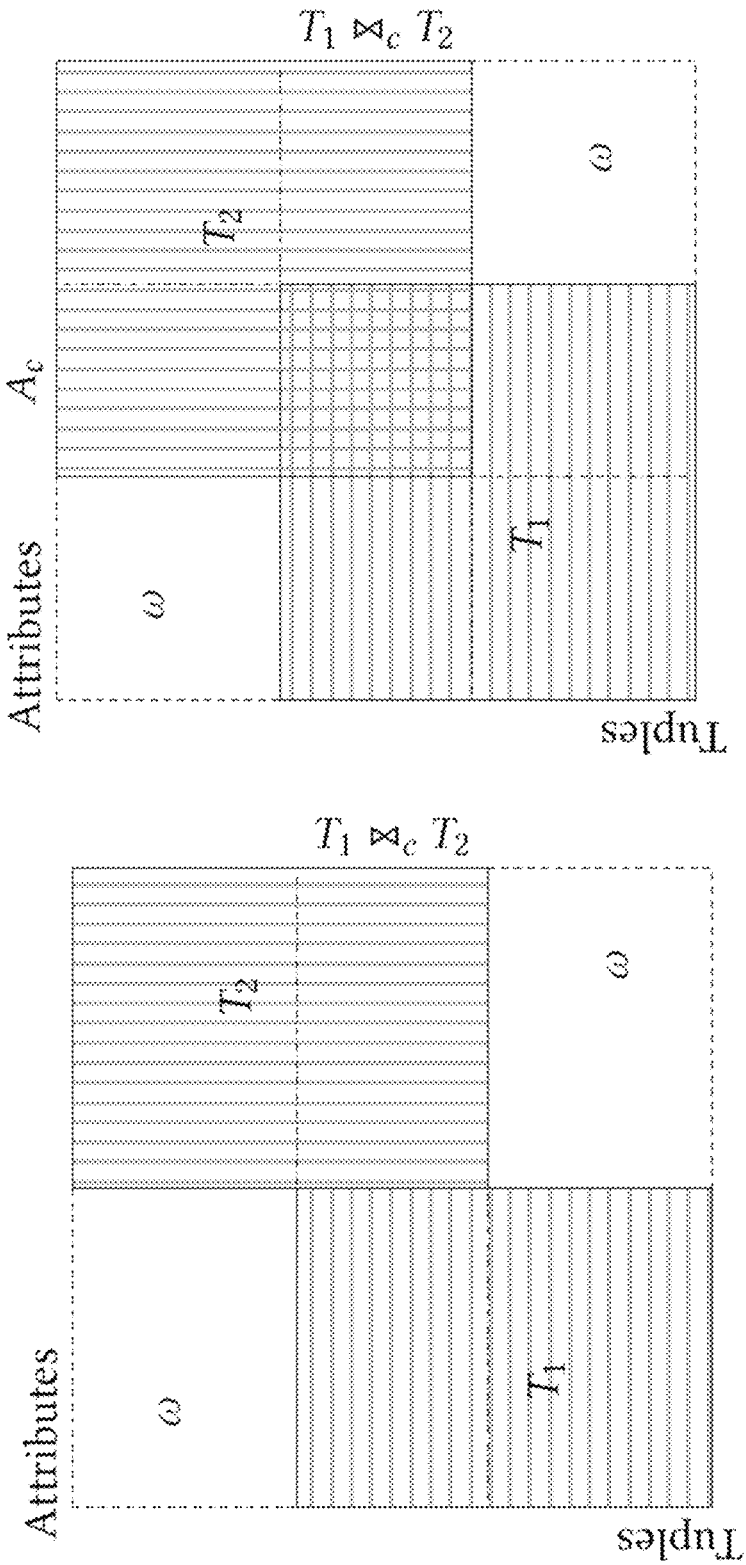
FIG. 2 illustrates a resulting relation of a full outer join between two tables $T_1$ and $T_2$ according to various embodiments of the present disclosure.

Proof. Consider $\mathcal{P} = T_1 \bowtie_c T_2$ with any general join conditions c (FIG. 2a). FIG. 2a depicts an outer join with general join conditions.

Operand Recoverability: The resulting table of a full outer join essentially consists of three parts: the inner join results, the tuples of $T_1$ that do not join, and those of $T_2$ that do not join. Since the schema of the resulting relation consists of all attributes in both tables, one only needs to project out the corresponding set of attributes for $T_1$ (or $T_2$) to recover $T_1$ (or $T_2$). Formally, $$T_1 = \sigma_{\forall A_i \neq \text{null}} \prod_{L_{T_1}}(P), \quad T_2 = \sigma_{\forall A_i \neq \text{null}} \prod_{L_{T_2}}(P) \qquad (2)$$

where $A_i$ is an attribute in $L_{T_1}$ or $L_{T_2}$. The selection step after projection is to remove the tuples that contain null values in all attributes (e.g., unshaded regions in FIG. 2a).

Commutativity: By its definition, it is easy to show that full outer join is (strong) commutative: among the three sets of tuples in the resulting table, the inner join is known to be commutative; that also leaves the tuples from $T_1$ and $T_2$ that do not appear in the inner join unchanged when operands are switched.

Associativity: The full outer join is strong associative with certain assumptions made with respect to the join conditions. However, this is not true under any general join conditions. It is proved that it is weak associative under any conditions.

Comparison: The way to combine queries together is a vital design decision of a CDBMS. Systems such as ShareDB and multiquery optimization (MQO) meet this challenge by combining query results with the union ($\cup$) operator. However, this excludes operands that are not union compatible and thus is not as general a solution as $\psi$. Certainly, there are practical issues with the use of $\psi$, one major concern being the size of its output table. This disclosure develops techniques to reduce the size of the output table.

Size of Resulting Relation. With the $\psi$-operator as a key concept in the disclosed framework, the size of its resulting table becomes an important query optimization consideration. In that sense, the cross product is in obvious disadvantage over outer join. Another disadvantage of the cross product is that neither operand can be an empty relation (Theorem 1). Therefore, unless specified otherwise, discussions herein will be focused on the outer join. An interesting observation is that one can control the size of outer join results via different join conditions. Specifically, the selectivity of the join condition determines how many times a tuple in $T_1$ or $T_2$ will appear in the final result (middle region shown in FIG. 2a). To reduce such redundancy, one can apply a dummy condition to disallow any joined tuples.

Definition 10. Given any two tables $T_1$ and $T_2$, an anti-join condition $\bar{\theta}$ ensures $T_1 \bowtie_{\bar{\theta}} T_2 = \emptyset$, and $T_1 \bowtie_{\bar{\theta}} T_2 = T_1 \times \omega_2$.

In practice, the anti-join condition can be implemented as a system artifact or a real join condition that never returns true in any tuple (e.g., comparing an attribute with infinity).

Definition 11. For any two input tables, an outer join with join conditions that never returns a tuple in the inner join section is called an exclusive outer join; otherwise it is called an inclusive outer join.

In the remainder of this disclosure, unless stated otherwise, when an outer join without a join condition is mentioned, the intended meaning is that the reasoning is true under arbitrary conditions.

Another factor to consider is the size of the ω values—the storage cost of a NULL value is 1 bit in modern DBMSs. Thus, tuples appear in the inner join section can potentially decrease the number of NULL values. In an extreme case, all tuples in $T_1$ and $T_2$ participate in a 1-to-1 join, and the size of the outer join is minimized (the same as the total size of both input tables). In practice, for equi-joins or more strictly, natural joins, one could store only one copy of the common attributes to further save storage space (FIG. 2b). FIG. 2b depicts an outer join with natural join conditions.

In considering the use of ψ to combine different query expressions, the size of the final table can be effectively controlled via the adaptation of various equivalence rules in query optimization.

Filtering the Global Query

As shown earlier, the global query Q can be written as $$q_1 \psi q_2 \psi \ldots \psi q_m = Q$$

For convenience, the PsiDB name is given to the disclosed framework of the system 100 to highlight the role the ψ operator. Upon generating the global relation $\mathcal{P}$, PsiDB can use a result transformation application to send the tuples of $\mathcal{P}$ to query filters associated with each original query $q_i$. The result transformation application will check each tuple with recovering functions and make on-the-fly decisions on what tuples/columns belong to its corresponding query result $p_i$. In some embodiments, the recovering functions can be predefined.

Comparison: In ShareDB and DataPath, each tuple in the global relation is associated with a bitmap describing which queries the tuple belongs to. Then the tuple is only multicasted to corresponding queries. The system 100 does not need to tag the tuples with its destination queries, therefore the tuples can be broadcasted to all queries.

Equivalence Rules

An equivalence rule essentially transforms a relational algebraic expression to another logically equivalent expression. They enable different query execution plans to be generated and evaluated thus form the foundation for query optimization. This disclosure extends work in traditional relational algebra to consider equivalence rules related to ψ operators and concurrent queries. In preparing this disclosure, popular equivalence rules that are widely adopted in traditional DBMSs were studied. Based on such rules, new rules that work particularly for batched queries were developed. The disclosed rules can cover optimization techniques used in ShareDB and DataPath, and also provide extra optimization paths that are not found in such systems.

Definition 12. Suppose a relational algebraic expression $\varepsilon_1$ contains a series of ψ operations over multiple operands, e.g., $\varepsilon_1 = e_1 \psi e_2 \psi \ldots e_m$, the expression is said to be weakly equivalent to another expression $\varepsilon_2$, denoted as $\varepsilon_1 \cong \varepsilon_2$, if all the operands $e_1, e_2, \ldots e_m$ of $\varepsilon_1$ can be exactly recovered from the resulting relation of $\varepsilon_2$.

Via weak equivalence, an expression can be transformed into one that, although does not derive the same exact resulting relation, carries all the data and a means to recover the operands (of the original expression). Note that such transformations are not allowed in traditional DBMSs. In practice, it is preferred that a common function be used to recover the operands from both $\varepsilon_1$ and $\varepsilon_2$ in the disclosed equivalence rules. The following definitions are needed for describing the rules.

Definition 13. Suppose a query $q_i$ applies a selection with a set of conditions in conjunctive form (denoted as Bi) over a relation. Such selection conditions in all n concurrent queries over a relation is then denoted as $\Theta_T = \Theta_1 \cup \Theta_2 \cup \ldots \cup \Theta_n$.

Example 2. The conditions sets for query workload as shown in Table 2 are as follows.

$\Theta_1 = \{(\text{retprice} < 40)\}$ $\Theta_2 = \{(\text{supprive} < \text{retprice}), (\text{supprice} < 40), (C_{(S,PS)}), (C_{(PS,P)})\}$ $\Theta_3 = \{(\text{supprice} < \text{retprice}), (\text{avlqty} > 0), (C_{(S,PS)}), (C_{(PS,P)})\}$ $\Theta_4 = \{(\text{supprice} < \text{retprice}), (\text{state} = FL), (C_{(S,PS)}), (C_{(PS,P)})\}$ $\Theta_5 = \{(\text{state} = FL), (C_{(PS,S)})\}$ where C(A,B) represents equality join conditions set on foreign keys between tables A and B for easier presentation, e.g., C(S,PS)={S.skey=PS.skey}. The total set of conditions for all 5 queries is $\theta_T = \{(\text{retprice} < 40), (\text{supprice} < \text{retprice}), (\text{supprice} < 40), (\text{avlqty} > 0), (\text{state} = FL), (C_{(S,PS)}), (C_{(PS,S)})\}$ Definition 14: The common selection conditions among all n concurrent queries over a relation is denoted as $\Theta_I = \cap_{i=1}^n \Theta_T$. We also define $\Theta'_I$ as the set of selection conditions for a query $q_1$ (over a relation) that is not found in $\Theta_I$, i.e., $\Theta'_I = \Theta_i - \Theta_I$.

Definition 15: We can write an expression $\theta_I$ with all members of $\Theta_I$ in a conjunctive form, i.e., $\theta_I = \bigwedge_{all} (\Theta_I)$. In the same way, we define an expression $\theta'_I = \bigwedge_{all} (\Theta'_I)$. Furthermore, for all the n queries, we define an expression $\theta_D$ to connect all $\theta'_I$ expressions in a disjunctive form, i.e., we have $\theta_D = \bigvee_{i=1}^n \theta'_i$.

Rule 1: Sequence of Selections

In traditional DBMSs, $$\sigma_{\theta_1 \wedge \theta_2 \wedge \ldots \wedge \theta_n}(r) = \sigma_{\theta_1}( \ldots (\sigma_{\theta_n}(r))) \quad (3)$$

In other words, a selection over a relation can be broken down to conjunctive conditions. Furthermore, $$\sigma_{\theta_1 \wedge \theta_2}(r) = \sigma_{\theta_1}(\sigma_{\theta_2}(r)) \quad (4)$$

and this essentially means the conditions can be applied to the relation one by one in any order. Such rules reveal the high level of flexibility in reordering different selection conditions over the same relation of the same (only) query. This is beneficial to query optimization as it provides a rich set of computational paths (e.g., execution plans) with different costs for the same set of selections. For example, a common practice is to process conditions with higher selectivity first to reduce the size of intermediate results. This disclosure is interested in the flexibility of doing the same while processing batched queries. First, observe that reordering of selection conditions cannot be done freely across different queries. In other words, $$\sigma_{\theta_1}(r) \psi \sigma_{\theta_2}(r) \ldots \psi \sigma_{\theta_n(r)} \neq \sigma_{\theta_1}(\overline{\sigma}_{\theta_1}( \ldots (\sigma_{\theta_n}(r))))$$

and the above is true for any ordering of $\sigma_{\theta_i}$ on the right-hand side (RHS). Fortunately, the following theorem shows that there is room for rearranging the selection conditions among concurrent queries.

Theorem 3 (Sequence of Selections). For n concurrent queries, each of which applies a selection to the same table r, $$\sigma_{\theta_1}(r) \psi \sigma_{\theta_2}(r) \psi \ldots \psi \sigma_{\theta_n}(r) \neq \sigma_{\theta_1 \wedge \theta_2 \ldots \theta_n}(r) \quad (5)$$

Proof. By the definition of weak-equivalence one needs to show that each operand on the left-hand side (LHS) must be recoverable from the resulting relation of both sides. Let us recall that table r follows schema R. For the LHS, its resulting table P is a wide relation with repetitive occurrences of R in its schema, one for each operand. Let us denote such occurrences as $R_1, R_2, \ldots, R_n$, one can recover each individual operand via $$\sigma_{\theta_i}(r) = f_i(\mathcal{P}) = \Pi_{R_i}\sigma_{\theta_i}(\mathcal{P}), \forall i$$

Note that the above is true for both cross product and full outer join under any join conditions.

For the RHS, denote its resulting table as $\mathcal{P}'$, it is shown that one can use the function $f'_i(\mathcal{P}') = \sigma_{\theta_i}(\mathcal{P}')$ to recover all operands of the LHS as follows.

$$\sigma_{\theta_1}[\sigma_{\theta_1 \vee \theta_2 \ldots \theta_n(r)}] = \sigma_{\theta_1}[\sigma_{\theta_1}(r) \cup \ldots \cup \sigma_{\theta_n}(r)] = \sigma_{\theta_1}(r), \forall i$$

The recoverability of all operands of LHS concludes the proof.

From the above definitions, the selection conditions over a relation for query i can be written as $$\theta_i = \wedge_{all}(\Theta_i) = (\wedge_{all}\Theta_I) \wedge (\wedge_{all}\Theta_I) = \theta'_i \wedge \theta_I \quad (6)$$

Therefore, the RHS of Eq. (5) becomes $\sigma_{\theta_D \wedge \theta_I}(r)$, and one can follow the traditional equivalence rules to make the following claims.

Corollary 1. The selection conditions within $\Theta_I$ can be applied sequentially on the relation r, according to Eq. (5).

Corollary 2. The selection condition sets $\theta_D$ and $\theta_I$ can be applied sequentially, and in any order.

$$\sigma_{\theta_I \wedge \theta_D}(r) = \sigma_{\theta_D}(\sigma_{\theta_I}(r)) = \sigma_{\theta_I}(\sigma_{\theta_D}(r))$$

Example 3. In one example database, taking a subset of the queries q={$q_2, q_3, q_4$} as the workload, one gets $\theta_I$={(supprice<retprice)∧$C_{P,PS}$∧$C_{P,PS}$} and $q'_2$={(supprice>40)},$q'_3$={(avlqty>0)} and $q'_4$={(state=FL)}therefore the non–common conditions are $\theta_D$={(supprice>40)∨(avlqty>0)∨(state=FL)}

Significance: Rule 1 shows an important way to reduce the size of the results of the ψ operator. Consider the full outer join as ψ, the total size for the LHS of Eq. (5) is Ω(|r|n) where |r| denotes the number of tuples (cardinality) of table r. By following Theorem 3, one gets what is essentially the union among different subsets of r, and the total size is O(|r|). This rule was also applied in ShareDB.

The above two corollaries show that the query optimizer can try either way of ordering $\theta_D$ and $\theta_I$. Corollary 1 says that reordering the (conjunctive) terms in $\theta_I$ will also lead to plans of a different cost. Note that the existence of non-empty $\Theta_I$ is very common in real-world workloads. For example, in TPC-H, all joins are done based on equality of foreign keys, as shown in the example database.

Rule 2: Sequence of Projections

In traditional DBMSs, $$\Pi_{L_1}(\Pi L_2(\ldots \Pi_{L_n}(r))) = \Pi_{L_1}(r) \quad (7)$$

This means in a query with a sequence of projections over a relation, only the last one matters. If one considers the projections on the same relation from concurrent queries, the rule is of a different form.

Theorem 4 (Sequence of projections). For n concurrent queries, each applies a projection over the same table r, $$\Pi_{L_1}(r) \psi \Pi_{L_2}(r) \psi \ldots \psi \Pi_{L_n}(r) \triangleq \Pi_{\cup_{i=1}^n L_i}(r) \quad (8)$$

where $L_i$ is a subset of attributes of r required by query $q_i$.

Proof. Show that, for any operand $\Pi_{L_i}(r)$ of the LHS, all its tuples will be found in the resulting table (named $\mathcal{P}'$) of RHS. While $\mathcal{P}'$ may drop some rows out of r due to the generation of duplicates, any duplicate in it is also a duplicate in $\Pi_{L_i}(r)$ as $L_i$ is a subset of the attributes of $\mathcal{P}'$. Given that, $\Pi_{L_i}(r)$ can be exactly recovered from $\mathcal{P}'$ by simply applying the projection using its own attribute set:

$$\Pi_{L_1}(r) = f_i(\mathcal{P}') = \Pi_{L_1}(\mathcal{P}'), \forall i$$

In fact, the same function $f$ can be used to recover the operands from the resulting relation of the LHS.

Significance: Similar to Rule 1, one can also avoid the large size resulted from a series of ψ operations over different parts of the same table. In Rule 5, this idea is extended to more general situations. Note that neither ShareDB nor DataPath applied optimization on projection like Rule 2.

Example 4. Referring to the example database, one can write another query similar to $q_1$ on table PART.

$q'_i$: SELECT pkey, mfgr, retprice FROM part P WHERE mfgr=mf2

When q={$q_1, q'_i$}, the projected attributes for each of the queries are $L_1$={pkey,name, retprice}, $L'_1$={pkey, mfgr, retprice}; then the RHS returns the table PART with Lq=$L_1$ ∪$L'_1$={pkey, name, mfgr, retprice} attributes.

Rule 3: Distributive Selection

In traditional DBMSs, selection is distributive over join if the selection conditions can be grouped into two parts, each of which involves attributes in only one relation, e.g., $$\sigma_{\theta_1 \wedge \theta_2}(T_1 \bowtie_c T_2) \equiv \sigma_{\theta_1} T_1) \bowtie_c (\sigma_{\theta_2} T_2) \quad (9)$$

where c is any join condition and all the conditions in $\theta_1$ and $\theta_2$ involve attributes only in $T_1$ and $T_2$, respectively. There are similar findings regarding 4).

Theorem 5 (Distributive Selection over 0). With the same setup shown in Eq. (9), $$\sigma_{\theta_1 \wedge \theta_2}(T_1 \psi T_2) \equiv (\sigma_{\theta_1 \wedge \theta_2} T_1) \psi (\sigma_{\theta_2} T_2)$$

Proof. First, both LHS and RHS result in relations with the same schema containing all attributes of both $T_1$ and $T_2$. Second, one sees that only tuples that pass selection condition will appear in the resulting tables of both LHS and RHS. For full outer join, the resulting table on both sides have three types of tuples (FIG. 2a): $T_1\omega_2$, $T_1T_2$, and $\omega_1T_2$. Due to the same join conditions applied for LHS and RHS, one has the same set of tuples for all three types.

The above results can be extended to more than two tables.

Corollary 3. For a series of tables $T_1, T_2, \ldots, T_n$ and $\theta_i$ is a set of join conditions that only involve attributes in table $T_i$, $$\sigma_{\theta_1 \wedge \theta_2 \wedge \ldots \wedge \theta_n}(T_1 \psi T_2 \psi \ldots \psi T_n) \psi (\sigma_{\theta_1} T_2) \psi \ldots \psi (\sigma_{\theta_n} T_n)$$

The proof can be achieved by reduction given the proof of Theorem 5.

Significance: Generally, when one applies the ψ operator first, one gets a larger relation than if one applies the single-table selection followed by the ∨) operator. This technique is popular in modern DBMSs, and was also adopted by ShareDB. In the system 100, it can also be used to transform an intermediate expression.

Example 5. In the example database, if q={$q_2, q_3, q_4$} and Θ={(supprice<retprice), (supprice<40), (avlqty>0), (state=FL), C(P, PS), C(PS, S)}; the selection can be distributed as $\sigma_{(rprice>sprice)\vee(sprice<40)\vee(avlqty>0)\vee(state=FL)}$(P$\psi_{C_{P,PS}}$SP$\psi_{C_{PS,S}}$S)=$\sigma_{(rprice>sprice)}$ ($\sigma_{(sprice<40)\wedge(avlqty>0)}$P$\psi_{C_{P,PS}}$)$\psi_{C_{PS,S}}$ $\sigma_{(state=FL)}$S Rule 4: Distributive Projection In traditional DBMSs, a projection is distributive over joins.

$$\prod_{L_1 \cup \ldots \cup L_n} (T_1 \bowtie \ldots \bowtie T_n) \equiv \prod_{L_1}(T_1) \bowtie \ldots \bowtie \prod_{L_n}(T_n)$$

where $L_i$ is a subset of the attributes of table $T_i$. The above rule is a common query optimization strategy by filtering out attributes that will not be in the final relation $\mathcal{P}$. In CDBMS, the following theorem shows that projection is also distributive over the $\psi$ operator.

Theorem 6 (Distributive projection). Suppose one has n concurrent queries, and query $q_i$ projects $L_i$ out of table $T_i$. If one considers an exclusive outer join as the $\psi$ operator, $$\prod_{\cup_{i=1}^n L_i}(T_1 \psi T_2 \psi \ldots \psi T_n) \equiv \prod_{L_1}(T_1)\psi \prod_{L_2}(T_2)\psi \ldots \psi \prod_{L_n}(T_n) \quad (10)$$

Proof. Firstly, both sides generate a relation with the exact same schema $\cup_{i=1}^n L_i$. When one considers the exclusive outer join, one can see that the same set of tuples will also be generated on both sides. For such a claim, it suffices to show it for any two tables $T_1$ and $T_2$, then the results can be easily extended to n tables by reduction. Specifically, for both LHS and RHS, all tuples of both $T_1$ and $T_2$ will show up in the final result. By applying the exclusive outer join, each tuple in $T_1$ will appear once (with $\omega_2$) for both LHS and RHS. This concludes the proof.

Eq. (10) does not hold true for an outer join with arbitrary conditions (e.g., inclusive outer joins). This is because different tuples could appear in the inner join section of the final result. In particular, for the RHS of Eq. (10), the join condition can only be applied to attributes in $\cup_{i=1}^n L_i$. For the LHS, the join condition could include attributes that are not in $\cup_{i=1}^n L_i$. Therefore, the total number and content of tuples could be different. The applicability of Theorem 6 can be extended as follows.

Corollary 4. By considering inclusive outer join as the $\psi$ operator, Eq. (10) holds true only if all the join conditions of LHS involve attributes that are only found in $\cup_{i=1}^n L_i$.

Significance: Similar to Rule 3, optimization opportunities exist when performing the projection on individual tables first and then start the outer join—one avoids handling a large intermediate relation. More details of this can be found in Eq. (13), below. This rule was never mentioned in ShareDB and DataPath.

Rule 5: Skeleton Join

Using $\psi$ to combine multiple queries could result in a relation that is excessively large. The following theorem shows one way to effectively control the size. Unlike previous rules, this disclosure considers more general Selection-Projection-Join (SPJ) queries.

Theorem 7 (Skeleton Join). Suppose one has n concurrent queries, each of which involves a join among a subset of tables of the database $\tau_i \subseteq \mathbb{T}$, i.e., $q_i = \sigma_{\theta_i}(x_{\forall T \in \tau_i} T)$. Here $\sigma_{\theta_i}$ could contain conditions related to any table's attributes. Let T be the collection of all tables involved in the n queries, e.g., $\tau = \cup_{\forall i} \tau_i$, and C be the disjunctive form of all the conditions applied in individual queries, e.g., $C = \theta_1 \vee \theta_2 \vee \ldots \vee \theta_n$, $$q_1 \psi q_2 \ldots \psi q_n \triangleq \psi_c \atop \forall T_j \in \mathcal{T}} T_j \quad (11)$$

when $\omega_C$ is a full outer join with C as the join condition.

Proof. Show the LHS operands are recoverable from the RHS results via two cases. Let us first define $Z = x_{\forall T \in \tau_i} T$, which is the cross product of all tables accessed by the n queries.

Case 1: Consider a special case in which the same set of tables are accessed by all queries, e.g., $\tau_1 = \tau_2 = \ldots = \tau$. By directly applying Rule 1 (Theorem 3), $$LHS = \sigma_{\theta_1} Z \psi \sigma_{\theta_2} Z \ldots \sigma_{\theta_n} \neq \sigma_{\theta_1 \vee \ldots \vee \theta_n} Z = \sigma_C Z = RHS$$

Consider the full outer join as $\psi$, the resulting table of RHS, denoted as $\mathcal{P}$, consists of two different sets: (i) all tuples in $\sigma_C Z$, in which there is no $\omega$ values; (ii) those with w values as a result of some $T_j$ not joining with at least one other table. One can fully recover the LHS operands via the following functions:

$$f_i(\mathcal{P}) = \sigma_{\theta_i}(\mathcal{P}), \forall_i, 1 \leq i \leq n$$

Note that the function $f_i$ will return no tuples by working on subset (ii) of $\mathcal{P}$, as the selection condition $\theta_i$ will exclude any tuple with a $\omega$ value in it. On the other hand, one can recover all tuples needed from subset (i) since $\sigma_{\theta_i}(\sigma_C Z) = \sigma_{\theta_i} Z$.

Case 2: Consider the general case in which there are queries that only access a subset of $\tau$, e.g., $\exists j, \tau_j \subset \tau$.

For such a query $q_j$, one can generate a different query $$q'_j = q_j \times (\underset{\forall T \in \mathcal{T} - \mathcal{T}_j}{\times} \omega_T)$$

In other words, one can concatenate each tuple in the result of $q_j$ with NULL values to generate a relation that still follows the schema of Z. With this transformation, one can follow the same reasoning in Case 1 to show that Eq. (11) holds true if one replaces $q_j$ with $q'_j$ on the LHS, meaning q) can be recovered from the RHS results. Given q), one can easily recover $q_j$ by projecting out the attributes that belong to $q_j$ (e.g., non-NULL attributes).

Significance: Rule 5 carries significant value in query optimization. First, it shows that if a table is accessed by many queries (via joins), there is no need to join it many times (according to the definition of $\psi$). The RHS of Eq. (11) is a formula in which each database table only appears once regardless of the number of queries. Since the results of every query can be recovered by the RHS of Eq. (11), call its resulting table the skeleton table.

An interesting observation is that Case 1 still works if one considers cross product as the V) operator, and $\psi_C$ on the RHS is essentially an inner join, which yields a smaller resulting table as compared to using the outer join as $\psi$ in those cases. This is clearly an optimization path.

Case 2 in the above proof shows that, when a query accesses only a subset of the tables in $\tau$, one could piggyback it to the skeleton table in query processing. And the full outer join has to be used to recover the results of the piggybacked $q_j$ queries. Plus, one can work with the outer join to reduce the skeleton size as follows.

Reducing Size of Skeleton Tables: For $q_j$ mentioned in Case 2 of the proof of Theorem 7, there is potentially large storage overhead—in the skeleton, each tuple in $q_j$ will join with all other qualified tuples from all tables that $q_j$ does not access (e.g., those in $T-T_j$). To reduce that cost, one needs to (or preferably can) use the anti-join condition mentioned in Definition 10 to disallow such joined tuples.

With that, for aforementioned query $q_j$, replace its join condition with $\theta_j \wedge \bar{\theta}$. As a result, its tuples will not appear in the inner join segment of the skeleton table. Instead, they will only appear in the outer join segment in the format of $q'_j$ as mentioned above. Revisiting Eq. (11), replace the RHS join condition $C=\wedge_{i=1}^m \theta_i$ with $C=(\wedge_i \theta_i) \wedge (\wedge_j (\theta_j \wedge \bar{\theta}))$. it is easy to see that the existence of $\theta$ conditions does not change the correctness of Eq. (11)—it just gets a smaller skeleton table.

Example 6. Using the example database and queries and considering the workload of $q=\{q_1, q_2\}$, $$C = \{\theta_1 \vee \theta_2\} = \{(retprice < 40 \vee \bar{\theta}) \vee (supprice < retprice \wedge supprice < 40 \wedge C_{(P,PS)} \wedge C_{(PS,S)})\}$$

By applying Rule 5, one gets an RHS of $P\psi_{C_1} PS\psi_{C_2}S$, by distributing the conditions in C to the relevant tables. Specifically, $C_1=\{(retprice<40 \wedge \bar{\theta}) \vee (supprice<retprice \wedge supprice<40 \wedge C(P,PS))\}$ and $C_2=\{C(PS,S)\}$ Query Optimization in PSIDB The present disclosure can provide query optimization with a focus on algebraic optimization techniques. Examples below also briefly comment on optimization at the physical plan level.

Algebraic Optimization Towards Q

With the introduction of full outer join as a cost-effective $\psi$ operator, as well as the skeleton joins given by Theorem 7, many algebraic optimization can start from the following recommended expression for a workload.

Following the notations in Theorem 7, for n concurrent queries $q_1, q_2, \ldots, q_n$, and each query follows the SPJ pattern, e.g., $q_i = \Pi_{L_i} \sigma_{\theta_i} (\bowtie_{\forall T \in \tau_i} T)$, the global query can be rewritten by starting from Rule 5 and then applying Rule 2. The expression is $$Q = \prod_{(\cup_{i=1}^n L_i) \cup L_c} \left( \bowtie^c_{\forall T_j \in \mathcal{T}} T_j \right) \quad (12)$$

where $L_i$ is the set of attributes requested by query $q_i$ in its resulting table, and $L_c$ is the set of attributes involved in condition set C. Note that the RHS of Eq. (12) is basically that of Eq. (11) with extra projections for all the attributes needed by the queries. One can also project out the attributes in C for recovering the individual query results. It is easy to see that the projection does not change the correctness of Theorem 7 (Rule 5).

Eq. (12) serves as one starting point for query optimization in the system 100. It can be made more general by considering the following two scenarios.

Corollary 5. Modify Eq. (12) to handle cases of a cross product between two tables being requested by a query. Note that a cross product is essentially a join with an implicit condition that always returns true. Define such a condition as $\theta_{i,j}^0$ with respective to the two involved tables $T_i$ and $T_j$. Then just add $\theta_{i,j}^0$ to condition set C as a disjunctive term on the RHS.

Corollary 6. If a self-join between the same relation $T_i$ is requested by a query, Eq. (12) is still valid upon adding another copy of $T_i$ to the set T and adding the self-join condition to C as an extra disjunctive item.

Further Optimizations of Q are provided. The disclosed equivalence rules allow one to rewrite Q to explore other optimization opportunities such as the follows.

(1) According to Rule 4, for a set of attributes A that: (i) includes all attributes from table $T_j$ that appeared in $\cup_{i=1}^n L_i$; and (ii) includes all attributes from table $T_j$ that appeared in C, project out A from $T_j$ first, e.g., gets $$Q = \prod_{(\cup_{i=1}^n L_i) \cup L_c} \left( \bowtie^c_{\forall T_j \in \mathcal{T}} \prod_A (T_j) \right) \quad (13)$$

(2) Eq. (12) does not consider the order the tables are (outer) joined, as the order will not change the recoverability of the results according to the definition of $\psi$. However, the query optimizer will evaluate different sequences of the joined tables.

(3) For the join condition C, locate a common component $\theta_I$ among all $\theta'_i$ (Definition 15) such that $C=(\theta'_1 \vee \ldots \vee \theta'_n) \wedge \theta_I = \theta_D \wedge \theta_I$, and follow Rule 1 (Corollary 2) to reorder the selections.

(4) Following the discussions in (3), if the common conditions among all queries $\theta_I$ can be further written as $\theta_I = \theta_{T_1} \wedge \theta_{T_2} \ldots \theta_{T_m}$ where $\theta_{T_i}$ is a set of selection condition over input table $T_1$, one can apply Rule 3 to push down the selection condition $\theta_{T_i}$.

Tuples for individual queries can be recovered. One can assume that tuples of $\mathcal{P}$ can be delivered to the query filters in a streaming or batching manner. This can be done by mechanisms such as cursors supported by modern DBMSs.

A recovering function can be used to filter each tuple generated from Eq. (12) or Eq. (13). Note that $C=\theta_1 \vee \theta_2 \vee \ldots \vee \theta_n$, therefore $q_i$ can be obtained by $$q_i = \Pi_{L_i} \sigma_{\theta_i}(\mathcal{P}) \quad (14)$$

where $\mathcal{P}$ is the global query result. Interesting thing is that the recovering function is almost identical to the query expression itself (recall $q_i = \Pi_{L_i} \sigma_{\theta_i} (\bowtie_{\forall \tau \in \tau_i} T)$). This brings convenience in implementation as no extra guidance is needed for each query to recover the tuples. Now one can see why $L_c$ should be included in Eq. (12)—as each tuple arrives, one can also apply the selection with predicates involving attributes in $\theta_i$ but not in $L_i$.

Eq. (14) shows, due to the streaming nature of selection and projection, each tuple can be processed on-the-fly and discarded afterwards. Note that if duplicate elimination is required, more storage may be needed, e.g., according to 'Group By' as discussed herein.

Comparison: By the first glance, the system 100 might be less efficient in filtering the tuples as compared to ShareDB and DataPath. The system 100 may need to broadcast each tuple to all queries while ShareDB and DataPath only sends a tuple to queries it belongs to (due to the existence of query IDs for each tuple). However, it is believed that the system 100 approach performs better. For example:

(1) One can index the predicates in the selection conditions of all queries (6; in Eq. (14)). Via such indexes, a tuple can be sent to only relevant queries;
(2) For n queries, each tuple in ShareDB and DataPath needs n bits for the query list. Lack of such memory overhead in the system 100 allows the tuple to reside at higher levels of cache in modern CPUs/co-processors; and (3) For each tuple, it requires 0 (n) time to generate the query ID list in ShareDB and DataPath. Such a cost does not exist in the system 100.

Example 7. Now create the global query Q for all queries and the database mentioned in Example 1. The resulting global table $\mathcal{P}$ for all five queries is shown in Table 3. By applying Eq. (14) on each tuple, one can generate the resulting tables for all five queries (details not shown here).

TABLE 3

Global output table $\mathcal{P}$ for the five queries in Example 1.
Here ω represents a single NULL value.

| PPKEY | PSPKEY | PSSKEY | SSKEY | AVLQTY | PNAME | STATE | RETPRICE | SUPRICE |
|---|---|---|---|---|---|---|---|---|
| 1 | 1 | 2 | 2 | 5 | part1 | FL | 100 | 90 |
| 2 | 2 | 2 | 2 | 0 | part2 | FL | 10 | 8 |
| 3 | 3 | 1 | 1 | 5 | part3 | CA | 10 | 9 |
| 3 | 3 | 2 | 2 | 10 | part3 | FL | 10 | 8 |
| 5 | ω | ω | ω | ω | part5 | ω | 30 | ω |
| ω | 4 | 2 | 2 | 0 | ω | FL | ω | 40 |

Feasibility of the PsiDB Approach

Even after the algebraic optimization, the main concern over the system 100 remains: the skeleton join could still be too expensive to compute, and outputs a relation that is excessively large. Cost of computing $\mathcal{P}$: In Eq. (12), the skeleton join condition C combines many query-level conditions in a disjunctive form (e.g., C=$\theta_1 \vee \theta_2 \vee \ldots \vee \theta_n$). This could lead to scanning an entire (inner) table in processing the join. If processed in a traditional DBMS, each join becomes more selective therefore index-based join algorithms can be utilized. However, for a large number of queries, the combined number of tuples accessed in the table are comparable to the whole table therefore it is efficient to conduct a table scan.

Another important factor is the performance advantage of sequential I/O achieved in table scans. A recent work reported a break-even point (in selectivity) of less than 1% for an index-based scan to outperform table scan—indexed scan wins only when it accesses less than 1% of the data in a table, and this is highly unlikely in a CDBMS. Note that the above reasoning holds true for a database that is disk based, and a database that is in memory, although the advantage of scanning is much bigger in disk-based systems.

Size of $\mathcal{P}$: Another concern is the size of $\mathcal{P}$ could be excessively large, thus increasing the cost of the query result filtering. This is not the case with the development of the disclosed equivalence rules, as shown in the following lemma.

Lemma 8. Every tuple in the relation $\mathcal{P}$ will appear in the resulting table of at least one query.

Proof. The above can be seen from Eq. (12): if a tuple passed the condition C from the intermediate table resulted from $\bowtie_c T_j$, it means for some query $q_j$, its join condition $\theta_j$ is evaluated as true for that tuple, therefore the tuple will be in the final result of $q_j$.

Denoting the cardinality of a table T as |T|, the above lemma derives $|\mathcal{P}| \leq \Sigma_{i=1}^{n} |p_i|$. Denoting the degree and total size of a table as D and S, respectively, $$S_\mathcal{P} = D_\mathcal{P}|\mathcal{P}| \leq \frac{D_\mathcal{P}}{\alpha D_p} \sum_{i=1}^{n} |p_i| D_p = \frac{D_\mathcal{P}}{\alpha D_p} \sum_{i=1}^{n} S_{p_i} \quad (15)$$

where $D_p$ is the average degree of the resulting tables of all queries, and a is the average number of queries a tuple in $\mathcal{P}$ is used. Quantity a represents the overlap among the resulting tables of different queries, and Lemma 8 basically says α≥1. Such overlaps could lead to significant resource savings.

Empirical Evaluations

One example of the system 100 was implemented using TSQL, the procedural language supported by SQL Server. One component of the system 100 is the Query Transform module, which takes a batch of queries from the Query Generator and transforms all such queries into a global expression Q. In particular, the system 100 can apply the disclosed equivalence rules to reach a level of optimization shown in Eq. (13). The query Q is then transformed into an SQL statement and sent back to SQL Server to compute the final table $\mathcal{P}$. The framework of the present example collects the tuples of $\mathcal{P}$ in batches, and each batch is sent to an in-memory data filtering module that applies Eq. (14) to generate the individual query results. In short, this implementation does not explicitly consider any physical level optimizations.

In some experiments, a setup was provided as follows. A query workload was also provided. Synthetic data were used and query sets generated from the TPC-H benchmark for experiments. To investigate system behavior under different data sizes, three databases under TPC-H scale factors (SF) 1, 10, and 100, respectively, were built. Indexes for all attributes involved in any selection condition in the queries were built. Under SF1, the entire database was first loaded (by scanning tables) into the buffer pool thus it essentially became an in-memory database. The SF100 database is a typical disk-based system as the buffer pool can only hold a small part of the database, indexes, and runtime states. The SF10 database sits in the middle with a significant part of data and states in memory.

A query generator that outputs query workloads under different numbers of tables involved, attributes to apply a selection, the selectivity for selection operations, and total number of queries in a workload was developed. In particular, all TPC-H queries were transformed into "seed" queries by removing the aggregates and nested queries. The seed queries are essentially a skeleton join over multiple tables. Note that there are up to five tables joined in the same query in TPC-H. The seed queries serve as the template for generating actual queries with selection conditions (e.g., WHERE clause in SQL) applied to randomly-picked attributes and a random subset of the attributes to be projected out (e.g., SELECT clause in SQL) from the skeleton table. The selection conditions of each attribute are randomly generated towards a desired selectivity (and thus the size of the resulting table $\mathcal{P}$).

Results are reported under different workload intensity (e.g., total number of queries), database sizes, and also query selectivity. For the latter, the selectivity of selection conditions of the queries is controlled such that the final result table $\mathcal{P}$ reaches different sizes. In particular, four cases were tested in which the size of $\mathcal{P}$ is approximately 1%, 10%, 50% and 100% of the resulting table of a skeleton join (as shown in Eq. (11)) among all five tables in the database. This table is generated by applying all applicable foreign key equality conditions but no selection conditions over any single attribute. Queries can be viewed as a "shrunk" version of this skeleton join: they either have selection conditions over some attributes, or involve less than five tables. Therefore, this table can be viewed as the superset of data that will be touched by workloads.

Figure 3:
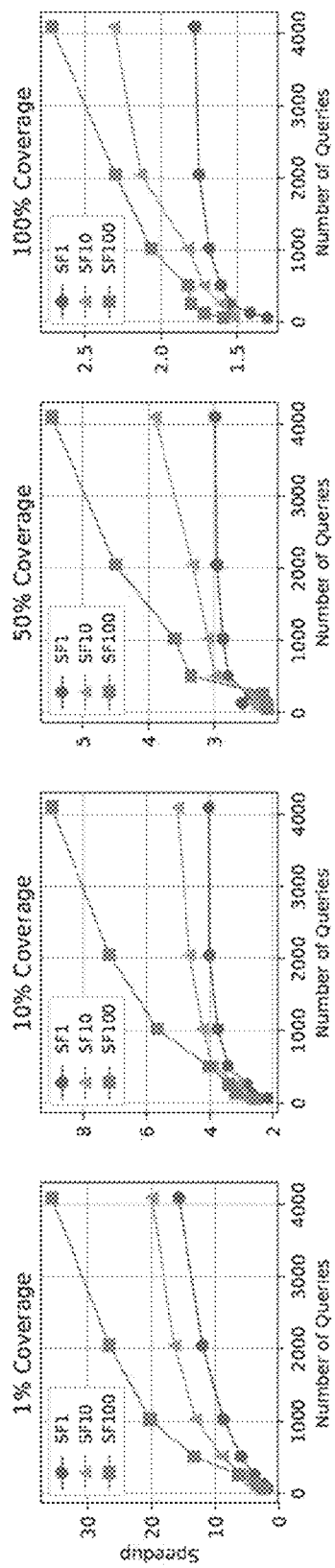
FIG. 3 is a graph of a speedup of the present disclosure over SQL Server under different database sizes and query numbers according to various embodiments of the present disclosure.
Figure 4:
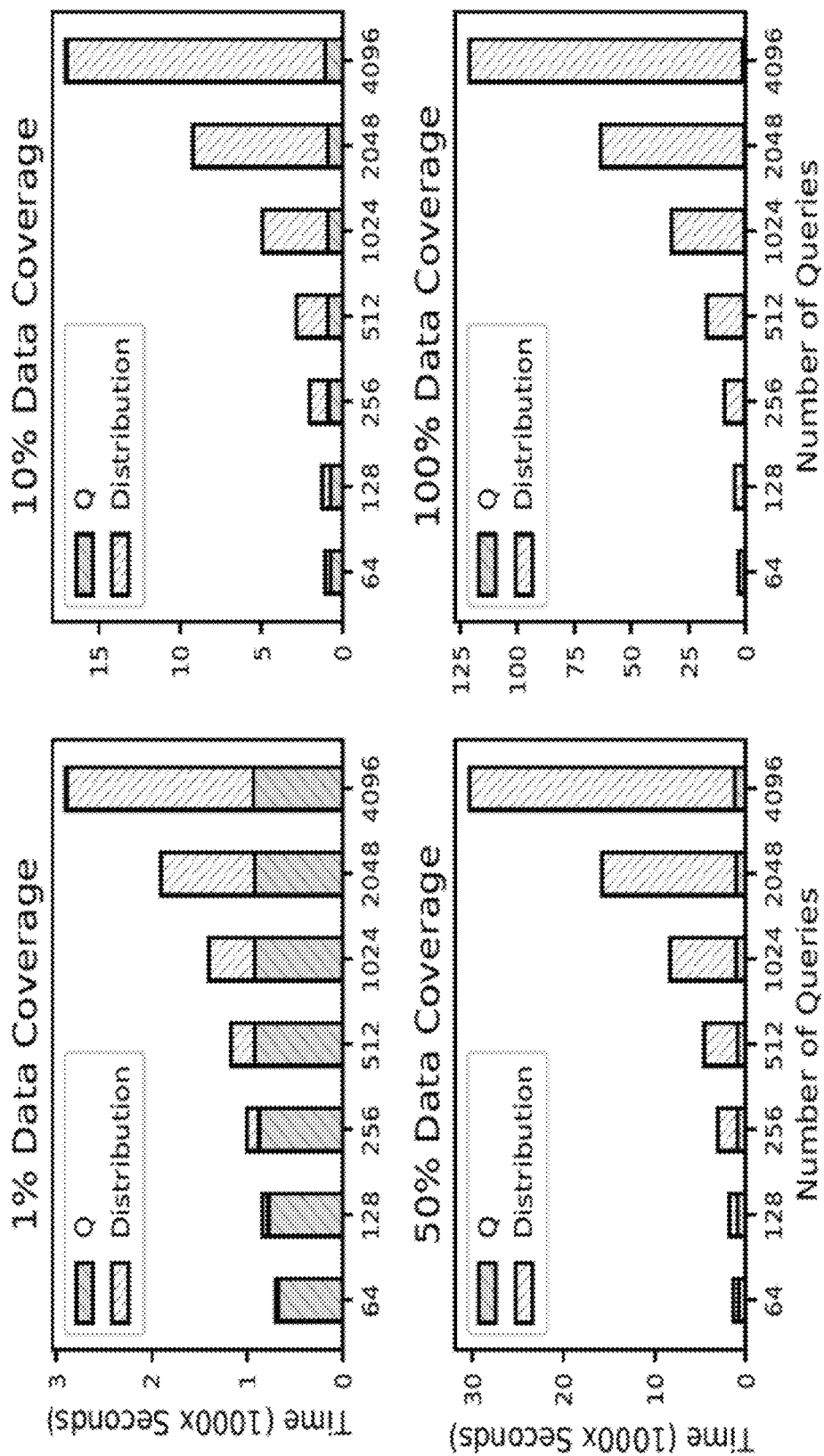
FIG. 4 is a graph of the time for processing Q and tuple distribution under SF100 according to various embodiments of the present disclosure.
Figure 8:
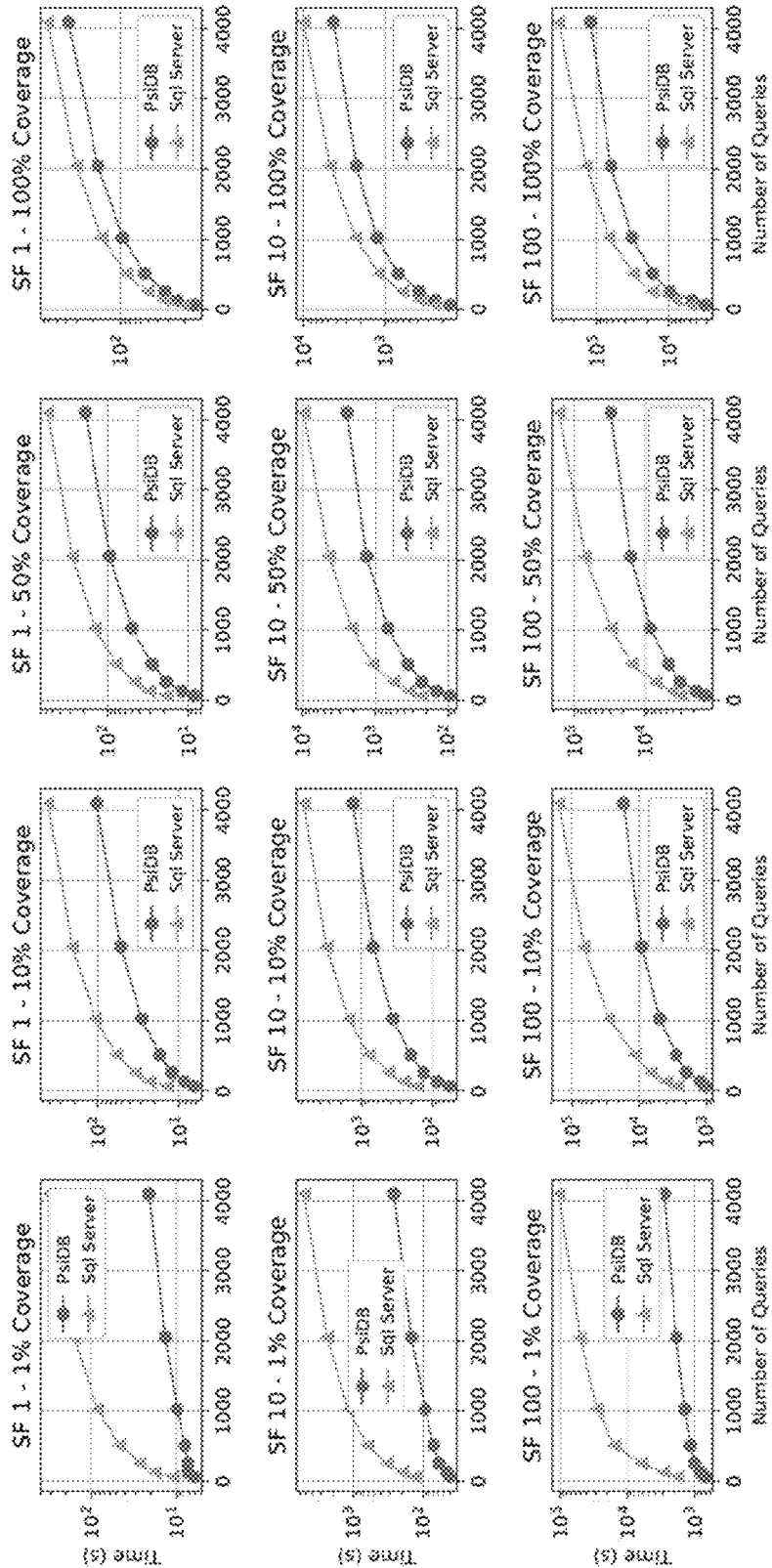
FIG. 8 shows graphs of execution time of the present disclosure and SQL Server under different database sizes and query numbers according to various embodiments of the present disclosure.

FIG. 3 shows the speedup of the system 100 over SQL Server in processing the same workload. Exact running time of such experiments are shown in FIG. 8. In general, the system 100 outperforms SQL Server in all cases, with the smallest speedup being 1.3× and highest being 36×. The speedup increases with the following factors: (1) more queries; (2) higher selectivity (smaller output table size); and (3) larger database sizes. For the first two factors, it is easy to understand because the amount of computation and data accesses shared among queries increase. Factor (2) is related to the size of $\mathcal{P}$, and costs of filtering tuples from P are found to be the dominating factor in the total workload processing time (more details in the next paragraph). Note that, the cases of 1% (with up to 36× speedup) and 100% (up to 2.6×) data coverage are put here as extreme cases. Real-world workloads are likely to fall into the 10%-50% range. For factor (3), when the database size increases from SF1 to SF100, example designs transition from an in-memory database setup to a more traditional disk-based database setup. To further investigate the effects of such transition, query execution plans were retrieved. In computing the global query Q, SQL Server always chose table scan for every node that involves accessing a table (even though matching indexes do exist). On the other hand, when it processes queries one-by-one, index scan was used for the same. This confirms that when a system is bound by disk I/O, the scan-based algorithm can show advantages over indexed access. With reference to FIG. 4, shown is a time for processing Q and tuple distribution under SF100 according to various embodiments of the present disclosure.

Figure 5:
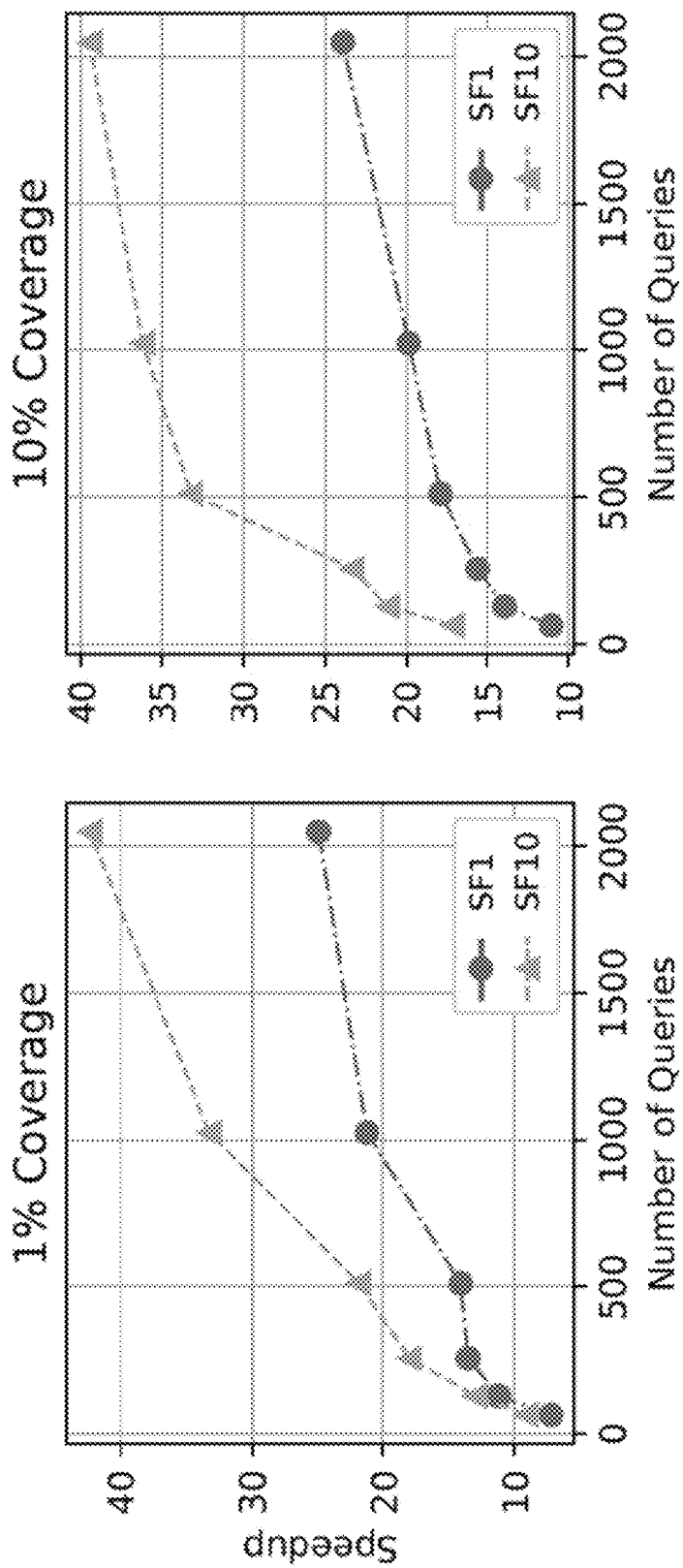
FIG. 5 is a graph of a speedup of the present disclosure over MySQL according to various embodiments of the present disclosure.

Cost of computing $\mathcal{P}$. By looking at the break-down of the workload processing time for the system 100 (FIG. 4), the time for processing the global query Q is very stable under different workload intensities. This is, again, because table scan based algorithms are chosen for processing Q even under 64 queries. This is also the foundation for the major claim of constant workload response time made by ShareDB. On the other hand, as the number of queries increases, the cost of filtering tuples from $\mathcal{P}$ increases (in a linear manner). Such costs become dominant in cases with higher number of queries. This is a very interesting finding: it means the system 100 becomes a computation-bound system even under large databases. In other words, as the cost of computing $\mathcal{P}$ is insignificant, the system 100 effectively removes the I/O bottleneck. As to the tuple distribution, there are abundant optimization opportunities (e.g., predicate indexing, SIMD). This means the potential of the system 100 could be even bigger than what are shown here. Similar trends are found in smaller databases (e.g., SF1 and SF10): the cost of computing $\mathcal{P}$ remains insignificant. Shown in FIG. 5 is a speedup of the system 100 over MySQL according to various embodiments of the present disclosure.

Comparison to ShareDB. To compare the system 100 with ShareDB, the environment is evaluated and the speedup of both systems over the same baseline is compared. In particular, examples generate a new set of workloads in which a query joins up to three tables in a in-memory database setup. As the selectivity of queries was on the high side (e.g., less tuples returned) in the ShareDB experiments, experiments were run under 1% and 10% coverage over the skeleton table. As can be seen in FIG. 5, the system 100 achieved double-digit speedup for most cases and the highest is more than 40×. This is much higher than the 1.2-10× that some publications have reported for ShareDB. Therefore, it is believed that the more extensive set of optimization techniques adopted in the system 100 translated into better performance (than ShareDB).

One contribution of this disclosure lies in the formal reasoning of concurrent query processing at the level of relational algebra. This disclosure has developed equivalence rules to guide the creation of query plans for processing a batch of queries together. Therefore, unlike SharedDB that currently focuses on one static plan, the present disclosure will pave the way for a systematic consideration of optimizing multiple queries in CDBMSs.

CONCLUSIONS

A framework for multiple query processing via query batching is introduced herein. This disclosure develops relational algebraic equivalence rules to transform multiple queries into a single global query. The results of the global query are distributed among all the queries on-the-fly. This disclosure describes the system 100, and shows many optimization opportunities that are captured by the disclosed system 100 and equivalence rules. This disclosure then recommends initial algebraic plans for query optimization and evaluates feasibility of the framework in comparison to similar systems.

On the theoretical side, development of more equivalence rules to reveal other resource sharing scenarios is beneficial, especially for the Group-By and Aggregate operators. A more fundamental work is to model the total cost of processing the large number of queries in the manner of the system 100. This is much needed to reveal the actual performance advantage of scanning-based data processing system in large. The problem of optimal batching of queries can be a critical issue for the proposed framework of the system 100, deeper understanding of the problem structure and features is needed for the development of efficient algorithms. Heuristic solutions with guaranteed performance is the way to pursue in such studies. The system 100 can take advantage of existing query optimizers towards many tasks it generates. There is significant opportunity for efficient processing of the $\psi$ operators, parallel computing for query filtering, and cost modeling of query plans.

Weak-Associativity of Full Outer Join

Figure 6:
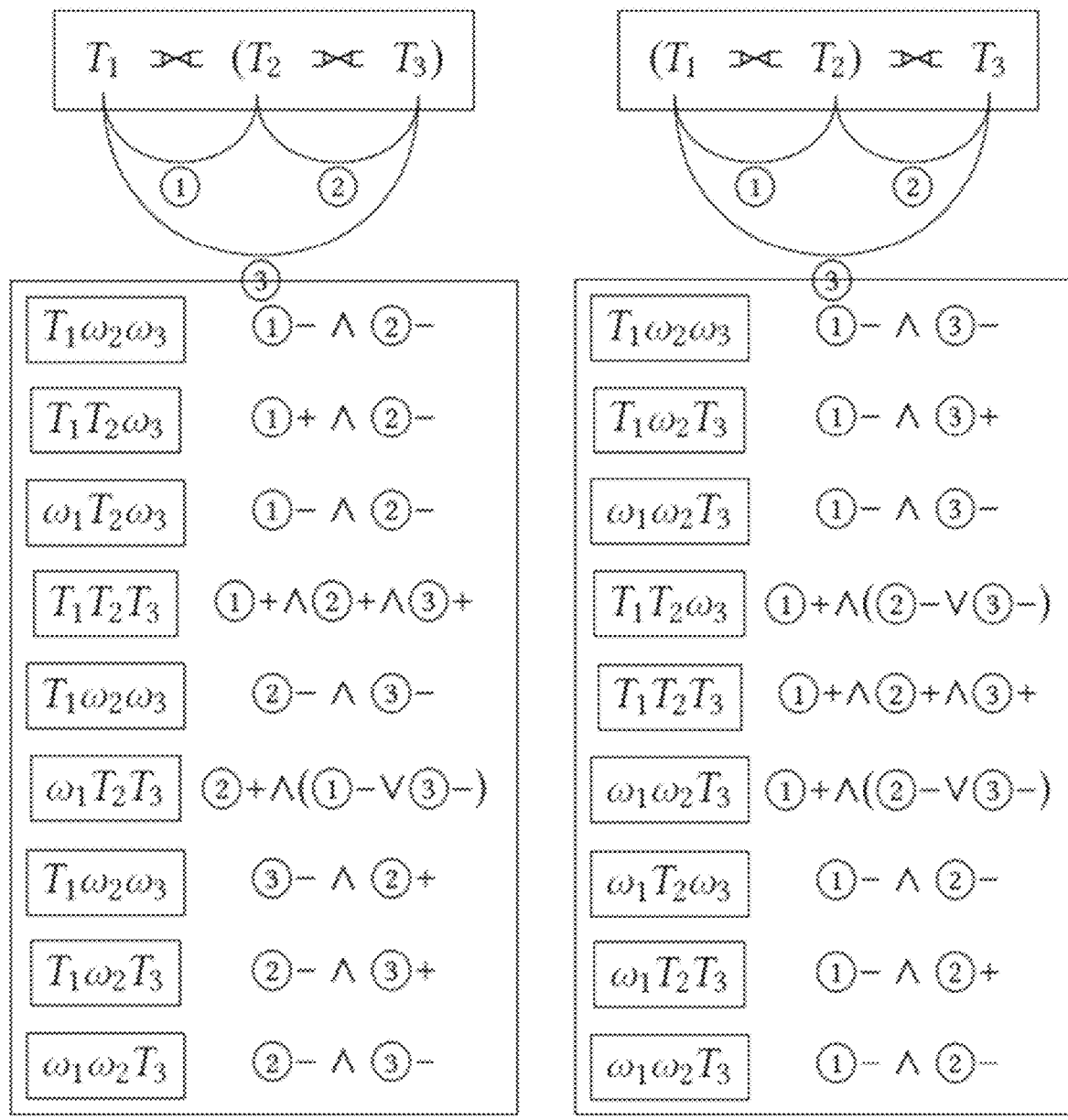
FIG. 6 shows two forms of consecutive full outer joins over three tables and the seven types of tuples in them according to various embodiments of the present disclosure.

Start by studying the difference between two associative forms among three tables $T_1$, $T_2$ and $T_3$, as illustrated in FIG. 6. Here $\omega_i$ represents a tuple following the schema of $T_i$ but with NULL values in all attributes. Note that the tuples in the resulting relation of either associative form should come from the skeleton relation $S=T'_1 \times T'_2 \times T'_3$ where $T'_i = T_i \cup \omega_i$. In particular, a series of conditions are applied to select tuples out of S. Without loss of generality, such conditions are shown as ①: those between tables $T_1$ and $T_2$ only;
②: those between tables $T_2$ and $T_3$ only;
③: those between tables $T_1$ and $T_3$ only.

Note that any condition that involves attributes from only one table can be irrelevant for these discussions thus are not shown here. Now consider the seven different types of tuples in the resulting table of either form. Such types differ by the appearance of w segments. For example, tuples of type $T_1T_2\omega_3$ consist of a real tuple from $T_1$, a real tuple from $T_2$, and NULL values in all attributes of the $T_3$ section. By analyzing the order of outer join operations between tables in both associative forms, one can derive how the three sets of conditions are evaluated in each type of tuples, as shown in FIG. 6. For example, to get the $T_1T_2\omega_3$ tuples, one must have conditions ①evaluated as true and ② as false in the left formula. For the right formula, such tuples are generated as a result of conditions ①being true plus either ② or ③ is false. Note that for tuple types $T_1\omega_2\omega_3$ for the left form and $\omega_1\omega_2T_3$ on the right form, each is generated under three different scenarios.

In FIG. 6, shown are two forms of consecutive full outer joins over three tables and the seven types of tuples in them according to various embodiments of the present disclosure.

Clearly, the two forms are not equivalent—multiple tuple types have different evaluations of all conditions thus contain different sets of tuples. However, one only needs to show that all three tables can be exactly recovered from both sides.

This disclosure shows that by applying the recovering function shown in Eq. (2) to the resulting table of both forms, one can get all three input tables back. Recall the function to recover $T_i$ is $$f(\mathcal{P}) = \sigma_{\forall A_i \neq null} \prod_{L_{T_1}} (\mathcal{P})$$

For that, gather all the relevant components for a table shown in FIG. 6. For example, all components needed for recovering $T_2$ is shown in FIG. 7. The set of $T_2$ tuples that can be recovered on the left form can be obtained by $$f(I) \cup f(ii) \cup f(iii) \cup f(iv)$$

In each component, an associated condition evaluation defines a subset of the $T_2$ tuples. By working on all four components, the total recoverable set for $T_2$ can be computed as a selection over $T_2$ with the following conditions:

$$(②+ \wedge +① \wedge +③)) \vee$$

$$(②+ \wedge (① - \vee ③) -)) \vee (②- \wedge ① +) \vee (②- \wedge ① -) =$$

$$②+ \wedge (① + \wedge ③) + \vee ① - \vee ③) -) \vee (②- \wedge (① - \vee ① +)) =$$

$$(②+ \wedge \text{TRUE}) \vee (②- \wedge \text{TRUE}) = \text{TRUE}$$

This means that all tuples of $T_2$ will be recovered by $f$.
Similarly, for the right form, one gets the set of $T_2$ tuples via $f(i') \cup f(ii') \cup f(iii') \cup f(iv')$, which is a select over $T_2$ by the following conditions:

$$(① + \wedge ① + ② \wedge +) ③ \vee (+① \wedge (-② \vee -③))) \vee (-① \wedge -②) \vee$$

$$(-① \wedge ② +) = +① \wedge (+② \wedge +③ \vee -② \vee -③) \vee (-① \wedge (-② \vee +②)) =$$

$$(+① \wedge \text{TRUE}) \vee (-① \wedge \text{TRUE}) = \text{TRUE}$$

This means that all tuples of $T_2$ will be recovered by $f$.
Similarly, for the right form, one gets the set of $T_2$ tuples via $f(i') \cup f(ii') \cup f(iii') \cup f(iv')$, which is a select over $T_2$ by the following conditions:

$$(① + \wedge ② + \wedge ③ +) \vee$$

$$(① + \wedge (② - \vee ③) -)) \vee (-① \wedge ② -) \vee (① - \wedge ② +) =$$

$$① + \wedge (② + \wedge ③ + \vee ② - \vee ③ -) \vee (-① \wedge (② - \vee ② +)) =$$

$$(① + \wedge \text{TRUE}) \vee (① - \wedge \text{TRUE}) = \text{TRUE}$$

With reference to FIG. 7 shown are components for recovering table $T_2$ from the two resulting tables shown in FIG. 6. The same results can be found for $T_1$ and $T_3$.

Figure 9:
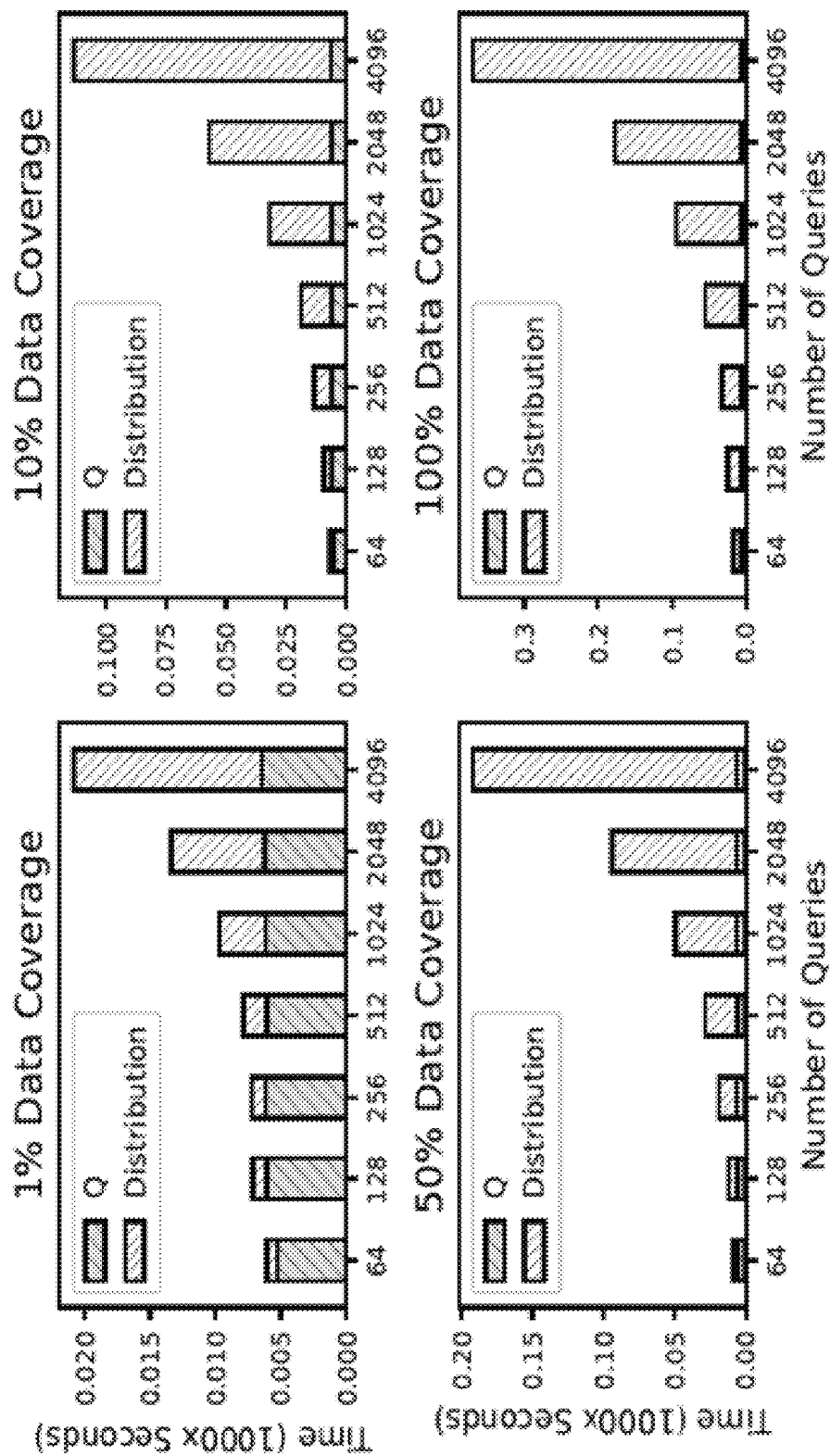
FIG. 9 is a graph of the time for processing Q and tuple distribution under SF1 according to various embodiments of the present disclosure.
Figure 10:
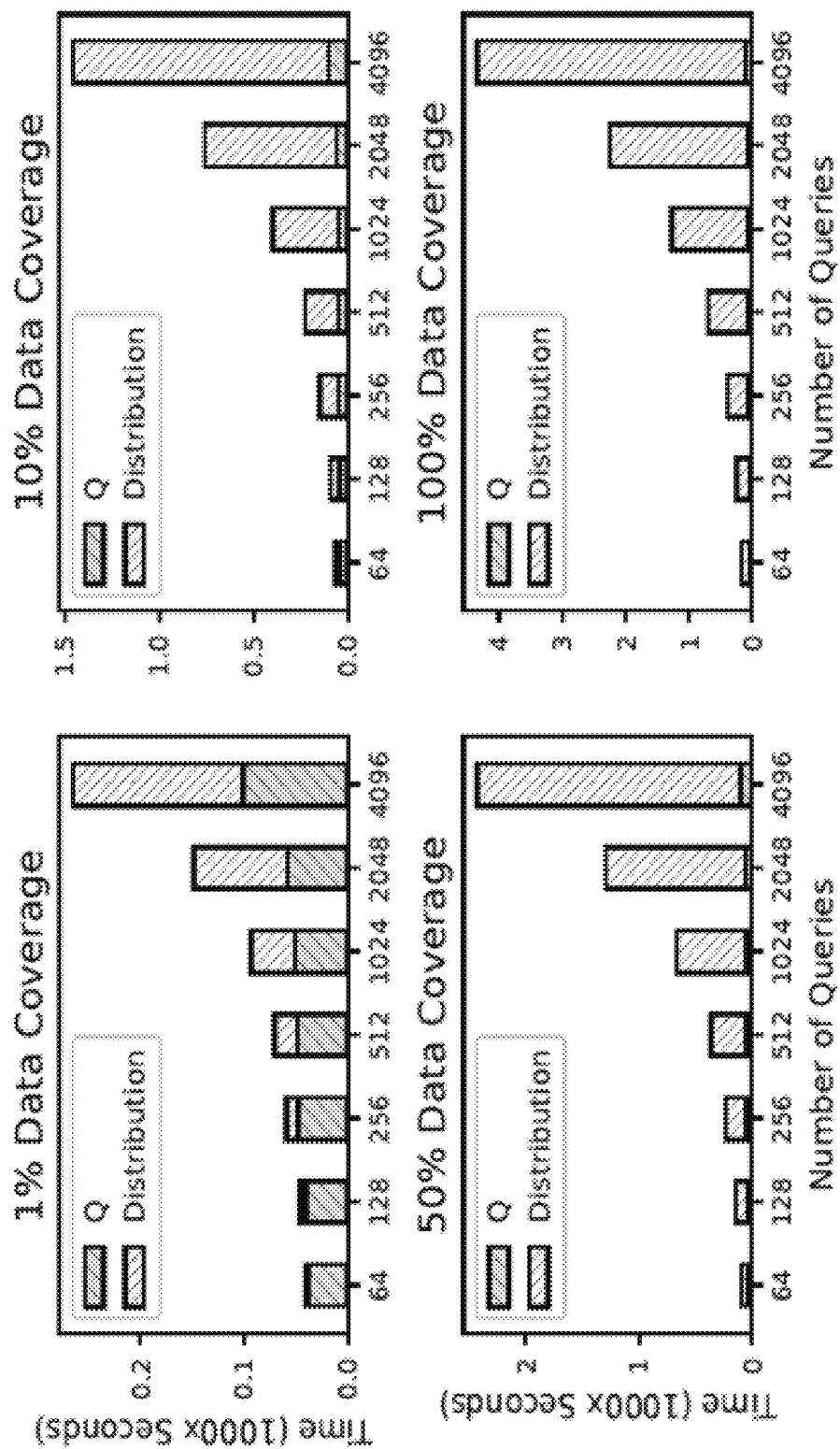
FIG. 10 is a graph of the time for processing Q and tuple distribution under SF10 according to various embodiments of the present disclosure.

Various experimental results can be found in FIGS. 8 to 10 according to various embodiments of the present disclosure. FIG. 8 shows execution times of PsiDB and SQL Server under different database sizes and query numbers. FIG. 9 shows a time for processing Q and tuple distribution under SF1. FIG. 10 shows a time for processing Q and tuple distribution under SF10.

Figure 11A:
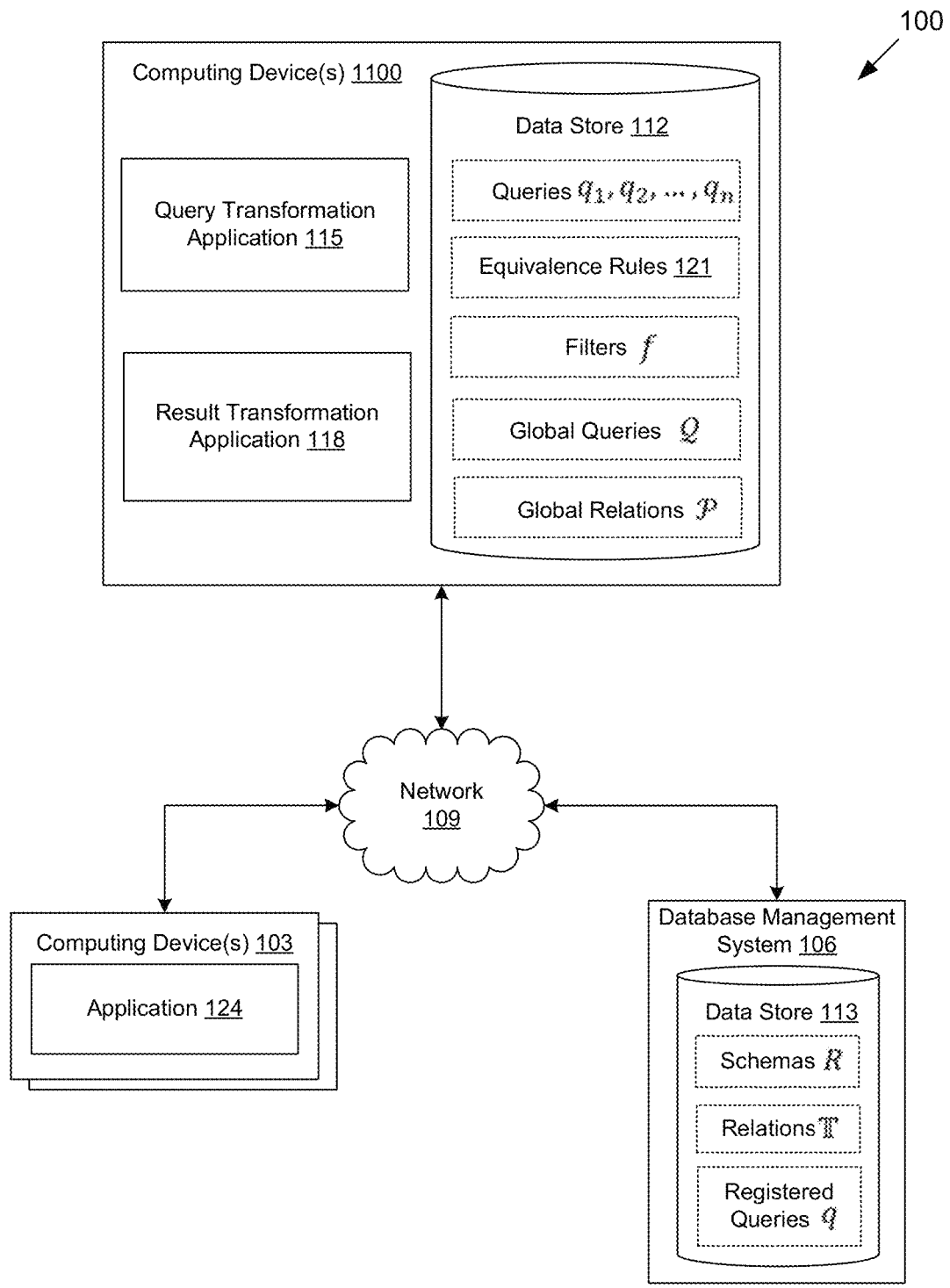
FIG. 11A is a schematic block diagram of a system and networked environment according to various embodiments of the present disclosure.
Figure 11B:
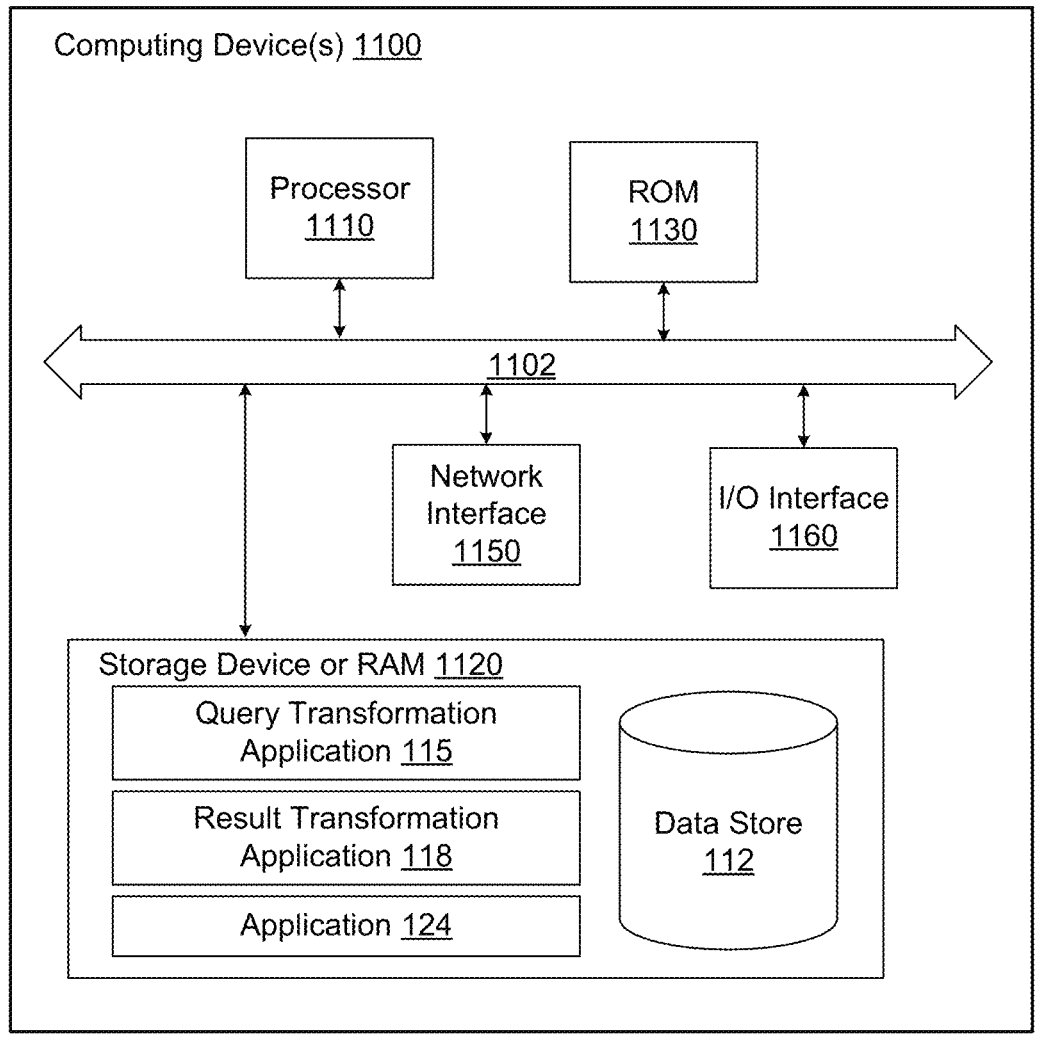
FIG. 11B is a schematic block diagram that illustrates an example computing device employed in the various embodiments described herein.

Turning to FIG. 11A, shown is a system 100 of FIG. 1 according to various embodiments. The system 100 includes computing device(s) 1100, computing device(s) 103, and database management system 106 which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing device 1100 may comprise, for example, a server computer or any other system providing computing capability. Alternatively, the computing devices 1100 may employ a plurality of computing devices that may be arranged, for example, in one or more server banks or computer banks or other arrangements. Such computing devices may be located in a single installation or may be distributed among many different geographical locations. For example, the computing devices 1100 may include a plurality of computing devices that together may comprise a hosted computing resource, a grid computing resource and/or any other distributed computing arrangement. In some cases, the computing devices 1100 may correspond to an elastic computing resource where the allotted capacity of processing, network, storage, or other computing-related resources may vary over time.

Various applications and/or other functionality may be executed in the computing devices 1100 according to various embodiments. Also, various data is stored in a data store 112 that is accessible to the computing device 1100. The data store 112 may be representative of a plurality of data stores 112 as can be appreciated. The data stored in the data store 112, for example, is associated with the operation of the various applications and/or functional entities described herein. The data stored in the data store 112 includes, for example, queries $q_1, q_2, \ldots, q_n$, equivalence rules 121, filters $f$, global query/queries Q, global relation(s) $\mathcal{P}$, and potentially other data, control structures, and/or operations.

The components executed on the computing device 1100, for example, include a query transformation application 115, a result transformation application 118, and other applications, services, processes, systems, engines, or functionality not discussed in detail herein. The query transformation application 115 is executed to facilitate transformation of queries of the database management system 106 into a global query Q according to techniques described herein.

The result transformation application 118 is executed to facilitate transformation of a result (e.g., global relation $\mathcal{P}$) of the global query Q comprising data from the data store 113 according to techniques described herein. The computing device 1100 including the result transformation application 118 can also comprise an OLAP database and associated features for online analytical processing.

In some embodiments, the query transformation application 115 or the result transformation application 118 run as a plug-in application to the database management system 106. In this embodiment, the data store 112 can be a data store of the database management system 106, such as the data store 113.

Various data associated with the database management system 106 is stored in the data store 113 that is accessible to the computing device 1100. The data store 113 may be representative of a plurality of data stores 113 as can be appreciated. The data stored in the data store 113, for example, is associated with the various applications and/or functional entities described herein, including a relational database managed by the database management system 106.

The computing device 103 is representative of a plurality of computing devices 103 that may be coupled to the network 109. The computing devices 103 may comprise, for example, a processor-based system such as a computer system. Such a computer system may be embodied in the form of a desktop computer, a laptop computer, personal digital assistants, cellular telephones, smartphones, web pads, tablet computer systems, wearable devices, or other devices with like capability. The computing devices 103 may include respective displays. The displays may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. In some embodiments, the computing device 103 may comprise, for example, a server computer or any other system providing computing capability. Alternatively, the computing devices 1100 may employ a plurality of computing devices that may be arranged, for example, in one or more server banks or computer banks or other arrangements.

The computing devices 103 may be configured to execute various applications such as an application 124 or other applications. The application 124 may be executed in a respective computing device 103, for example, to provide queries associated with the database management system 106, to query the data in the data store 113, or to access network content served up by the computing device 1100 and/or other servers (e.g., to render a user interface on a display of the computing device 103).

To this end, the application 124 may comprise, for example, a dedicated application for the database management system 106, a query application, an enterprise application, an Online Analytical Processing (OLAP) client application, a browser, etc. The computing devices 103 may be configured to execute applications beyond the application 124 such as, for example, email applications, word processors, spreadsheets, programming applications or environments, data visualization applications, data model development applications, or other applications.

Next, a general description of the operation of the various components of the system 100 is provided. To begin, the query transformation application 115 is configured to query the data store 113 of the database management system 106. The application 124, or users of the application 124 can provide queries $q_1, q_2, \ldots, q_n$, which are queries of the data store 133. In some embodiments, the database management system 106 can store the queries $q_1, q_2, \ldots, q_n$ as registered queries q to indicate that the queries are to be executed concurrently by the database management system 106. The query transformation application 115 can obtain the queries $q_1, q_2, \ldots, q_n$ and generate a single expression based at least in part on the queries $q_1, q_2, \ldots, q_n$. The query transformation application 115 can query the data store 113 based at least in part on the single expression to return a result corresponding to results for the queries $q_1, q_2, \ldots, q_n$. The query transformation application 115 can generate a single global query Q, which can include a single database query that is based at on the single algebraic expression, and can query the data store 113 using the single global query Q to return data necessary for the $q_1, q_2, \ldots, q_n$.

In some examples, the data store 113 comprises a set of relations $\mathbb{T}=\{T_1, T_2, \ldots, T_m\}$, each of which can contain different attributes. The query transformation application 115 can obtain the queries $q_1, q_2, \ldots, q_n$ associated with the set of relations T and the different attributes. The query transformation application 115 can generate, based at least in part on the set of relations $\mathbb{T}$, a single algebraic expression whose result is a relation $\mathcal{P}$ comprising a set of tuples as described herein. The single algebraic expression can be associated with a result (e.g., the global relation $\mathcal{P}$) comprising data necessary for the queries $q_1, q_2, \ldots, q_n$. In some examples, the data does not include any attributes unless those attributes have been used in queries $q_1, q_2, \ldots, q_n$.

The query transformation application 115 can generate the single algebraic expression based on applying equivalence rules 121 to algebraic expressions for the queries $q_1, q_2, \ldots, q_n$. The equivalence rules 121 stored in the data store 112 can be the equivalence rules described in detail herein. The equivalence rules 121 can involve a plurality of relational operators comprising a plurality of $\psi$ operators. The result transformation application 118 can provide each tuple in $\mathcal{P}$ to a plurality of filters $f$ to generate output relations corresponding to the queries $q_1, q_2, \ldots, q_n$, among other result transformation features and operations described in detail herein.

Referring now to FIG. 111B, an example hardware diagram of a computing device 1100 is illustrated. Any of the functionality discussed herein may be implemented, in part, using one or more elements of the computing device 1100. The computing device 1100 can include one or more of a processor 1110, a storage device or Random Access Memory ("RAM") 1120, a Read Only Memory ("ROM") 1130, a network interface 1150, and an Input Output ("I/O") interface 1160. The elements of the computing device 1100 are communicatively coupled via a bus 1102.

The processor 1110 can include an arithmetic processor, Application Specific Integrated Circuit ("ASIC"), or other types of hardware or software processors. The RAM 1120 and the ROM 1130 can include a memory that stores computer-readable instructions to be executed by the processor 1110. The RAM 1120 or the ROM 1130 can store computer-readable instructions thereon that, when executed by the processor 1110, direct the processor 1110 to execute the query transformation application 115, the result transformation application 118, the application 124, or various other aspects of the present disclosure described herein. Also stored in the RAM 1120 may be a data store 112 and other data. When the processor 1110 includes an ASIC, the processes described herein may be executed by the ASIC according to an embedded circuitry design of the ASIC, by firmware of the ASIC, or both an embedded circuitry design and firmware of the ASIC. As a non-limiting example group, the ROM 1130 comprises one or more of an optical disc, a magnetic disc, a semiconductor memory (e.g., a semiconductor, floating gate, or similar flash based memory), a magnetic tape memory, a removable memory, combinations thereof, or any other known memory means for storing computer-readable instructions. The network interface 1150 can include hardware interfaces to communicate over data networks such as the network 109 (FIG. 11A). The I/O interface 1160 can include device input and output interfaces such as keyboard, pointing device, display, communication, and other interfaces. The bus 1102 can electrically and communicatively couple the processor 1110, the RAM 1120, the ROM 1130, the network interface 1150, and the I/O interface 1160, so that data and instructions may be communicated among them.

In operation, the processor 1110 is configured to retrieve computer-readable instructions stored on a storage device, the RAM 1120, the ROM 1130, or another storage means, and copy the computer-readable instructions to the RAM 1120 or the ROM 1130 for execution, for example. The processor 1110 is further configured to execute the computer-readable instructions to implement various aspects and features of the present disclosure. For example, the processor 1110 may be adapted and configured to execute the processes described above. Also, a storage device (e.g., the storage device 1120) may store the databases and/or the data stored in the databases discussed herein.

Figure 12:
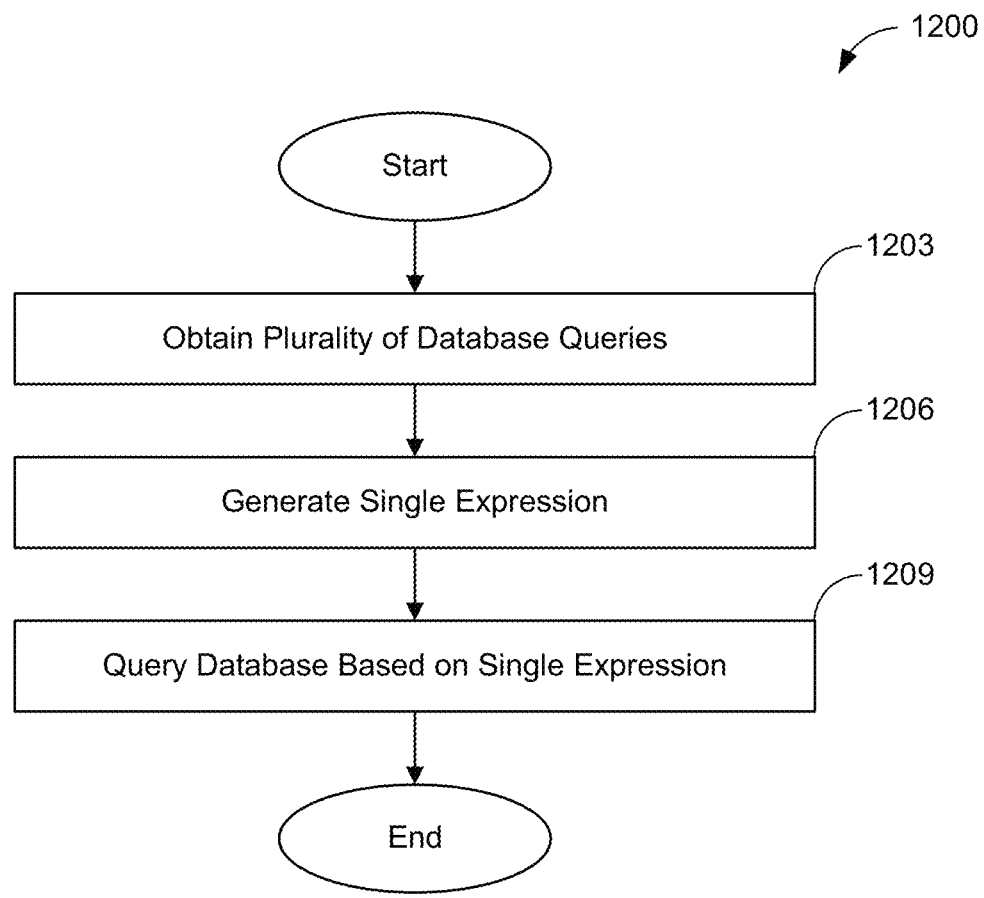
FIG. 12 illustrates an example flowchart of certain functionality implemented by portions of a computing device in the system and networked environment of FIG. 11A according to various embodiments of the present disclosure.

With respect to FIG. 12, shown is a process 1200 according to various embodiments of the present disclosure. At box 1203, the process 1200 includes obtaining a plurality of database queries $q_1, q_2, \ldots, q_n$ for querying a database or the data store 113. The database queries $q_1, q_2, \ldots, q_n$, can be obtained or received by a computing device such as the computing device 1100. In one embodiment, the database queries $q_1, q_2, \ldots, q_n$ are registered queries q or queries that are registered to be executed currently in the database management system 106 that comprises one or more computing devices.

At box 1206, the process 1200 can generate a single expression (e.g., a single expression that includes data necessary for each of the plurality of database queries $q_1, q_2, \ldots, q_n$). The single expression can be generated based on applying equivalence rules 121 to algebraic expressions for the plurality of database queries $q_1, q_2, \ldots, q_n$.

At box 1209, the process 1200 can include querying the database or the data store 113 based on the single expression. In some embodiments, the process 1200 can include modifying an aspect of a table in the database or the data store 113. The process 1200 can further include generating a second single expression corresponding to a second plurality of database queries by applying equivalence rules for the plurality of second database queries. Thereafter, the process can proceed to completion.

Figure 13:
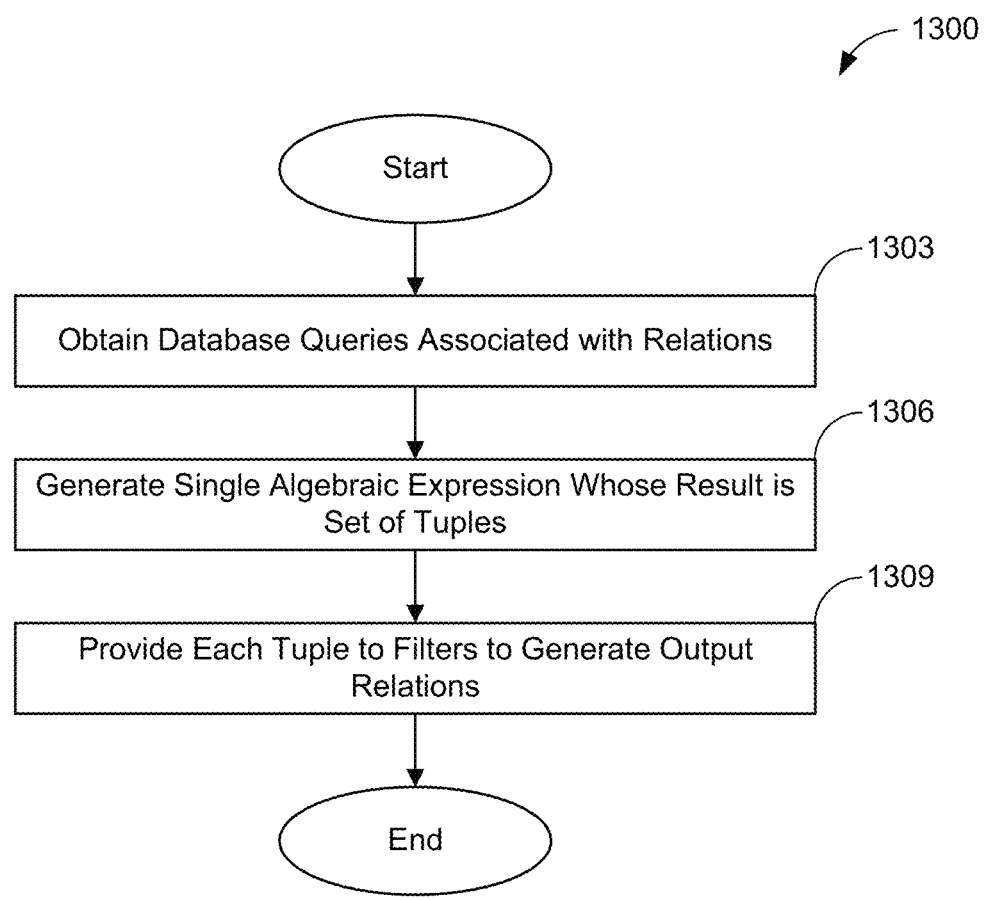
FIG. 13 illustrates an example flowchart of certain functionality implemented by portions of a computing device in the system and networked environment of FIG. 11A according to various embodiments of the present disclosure.

With respect to FIG. 13, shown is a process 1300 according to various embodiments of the present disclosure. At box 1303, the process 1300 includes obtaining database queries $q_1, q_2, \ldots, q_n$ associated with a database or data store 113 having a set of relations $\mathcal{P}=\{T_1, T_2, \ldots, T_m\}$, where each of the relations comprises attributes. In some embodiments, the database queries $q_1, q_2, \ldots, q_n$ are registered in the database management system 106 as registered queries q. The registered queries q can for example include queries $q_1, q_2, \ldots, q_n$ being registered to be executed concurrently by the database management system 106, another system, or in one or more computing devices. In some examples, the process 1300 can associate at least one of the database queries $q_1, q_2, \ldots, q_n$ with an algebraic expression that returns a vector of the relations.

At box 1306, the process 1300 includes generating a single algebraic expression based on the set of relations $\mathcal{P}$. The process 1300 includes generating the single algebraic expression so the result of the single algebraic expression is a relation $\mathcal{P}$ comprising a set of tuples. The single algebraic expression can also be generated based on applying equivalence rules 121 to algebraic expressions for the plurality of database queries $q_1, q_2, \ldots, q_n$. For example, the equivalence rules 121 can involve relational operators comprising a plurality of $\psi$ operators.

In some embodiments, the single algebraic expression is associated with a global relation $\mathcal{P}$ comprising data necessary for the database queries $q_1, q_2, \ldots, q_n$. In some examples, the data does not include any attributes unless those attributes have been used in the plurality of database queries $q_1, q_2, \ldots, q_n$. Some examples can also include a case where there is not any row of the data that is not used by the database queries $q_1, q_2, \ldots, q_n$.

At box 1309, the process 1300 includes providing' each tuple in $\mathcal{P}$ to a plurality of filters $f$ to generate output relations corresponding to the plurality of database queries $q_1, q_2, \ldots, q_n$. The process 1300 can also include generating a single database query Q based on the single algebraic expression, and querying the database or the data store 103 using the single database query Q to return data necessary for the plurality of database queries $q_1, q_2, \ldots, q_n$. In some embodiments, the process 1300 includes modifying at least one aspect of at least one table in the database or the data store 113. Thereafter, the process can proceed to completion.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

In addition to the foregoing, the various embodiments of the present disclosure include, but are not limited to, the embodiments set forth in the following clauses:

Clause 1. A system comprising: a database; at least one computing device in communication with the database, the at least one computing device being configured to at least: obtain a plurality of database queries; generate a single expression based at least in part on the plurality of database queries; and query the database based at least in part on the single expression to return a global relation corresponding to relations for the plurality of database queries.

Clause 2. The system of clause 1, wherein the single expression comprises data necessary for the relations for each of the plurality of database queries.

Clause 3. The system of clause 1 or 2, wherein the single expression is generated based at least in part on applying equivalence rules to algebraic expressions for the plurality of database queries.

Clause 4. The system of any of clauses 1-3, wherein the at least one computing device is further configured to at least: modify at least one aspect of at least one table in the database; and generate a second single expression corresponding to a second plurality of database queries by applying equivalence rules for the plurality of second database queries.

Clause 5. A method comprising: obtaining, via at least one computing device, a plurality of database queries; generating, via the at least one computing device, a single expression based at least in part on the plurality of database queries; and querying, via the at least one computing device, a database based at least in part on the single expression.

Clause 6. The method of clause 5, wherein the single expression comprises data necessary for each of the plurality of database queries.

Clause 7. The method of clause 5 or 6, wherein the single expression is generated based at least in part on applying equivalence rules to algebraic expressions for the plurality of database queries.

Clause 8. The method of any of clauses 5-7, further comprising: modifying at least one aspect of at least one table in the database; and generating a second single expression corresponding to a second plurality of database queries by applying equivalence rules for the plurality of second database queries.

Clause 9. A system comprising: a data store comprising a set of relations; at least one computing device in communication with the data store, the at least one computing device being configured to at least: obtain a plurality of database queries associated with the set of relations, each of the relations comprising attributes; generate, based at least in part on the set of relations, a single algebraic expression whose result is a global relation comprising a set of tuples; and provide each tuple in the global relation to a plurality of filters to generate output relations corresponding to the plurality of database queries.

Clause 10. The system of any of clauses 1-4, or 9, wherein the plurality of database queries are registered in a database management system.

Clause 11. The system of any of clauses 1-4, 9, or 10, wherein the plurality of database queries are registered to be executed concurrently.

Clause 12. The system of any of clauses 1-4 or 9-11, wherein at least one of the plurality of database queries is associated with an algebraic expression that returns a vector of the relations.

Clause 13. The system of any of clauses 1-4 or 9-12, wherein the single algebraic expression is associated with a global relation comprising data necessary for the plurality of database queries.

Clause 14. The system of any of clauses 1-4 or 9-13, wherein the data does not include any attributes unless the attributes have been used in the plurality of database queries.

Clause 15. The system of any of clauses 1-4 or 9-14, wherein there is not any row of the data that is not used by the plurality of database queries.

Clause 16. The system of any of clauses 1-4 or 9-15, wherein the single algebraic expression is generated based at least in part on applying equivalence rules to algebraic expressions for the plurality of database queries.

Clause 17. The system of any of clauses 1-4 or 9-16, wherein the equivalence rules involve a plurality of relational operators comprising a plurality of $\psi$ operators.

Clause 18. The system of any of clauses 1-4 or 9-17, wherein the at least one computing device is further configured to at least modify at least one aspect of at least one table in the data store.

Clause 19. The system of any of clauses 1-4 or 9-18, wherein the at least one computing device is further configured to at least generate a single database query based at least in part on the single algebraic expression.

Clause 20. The system of any of clauses 1-4 or 9-19, wherein the at least one computing device is further configured to at least query the data store using the single database query to return data necessary for the plurality of database queries.

Therefore, at least the following is claimed:

1. A system comprising:
a memory storing a database;
at least one computing device in communication with the database and comprising a processor, the processor being configured to execute a set of instructions to at least:
obtain a plurality of database queries;
prior to sending any query requests of the plurality of database queries to a database management system of the memory, transform the plurality of database queries using algebraic expressions and generate a single global query encompassing the algebraic expressions of all of the plurality of database queries;
send a single database query request based on the global query to the database management system of the memory storing the database; and
by querying the database using only the single database query request, to cause the database to return to the at least one computing device a result in the form of a global relation corresponding to relations for the plurality of database queries, wherein the global relation comprises response data from which results for all of the database queries can be derived.

2. The system of claim 1, wherein the global query is generated based at least in part on applying equivalence rules to algebraic expressions for the plurality of database queries.

3. The system of claim 1, wherein the processor of the at least one computing device is further configured to execute a set of instructions that cause the processor to at least:
modify at least one aspect of at least one table in the memory storing the database; and
generate a second global query corresponding to a second plurality of database queries by applying equivalence rules for the plurality of second database queries.

4. A method comprising:
obtaining, via at least one computing device, a plurality of database queries;
generating, via the at least one computing device, a single expression to expressions of each of the plurality of database queries and a global relation corresponding to relations for the plurality of database queries, wherein the global relation is a single relation that contains all data needed to derive results for all of the database queries; and without transmitting any of the plurality of database queries individually, querying, via the at least one computing device, a database based at least in part on the single expression.

5. The method of claim 4, wherein the single expression is generated based at least in part on applying equivalence rules to algebraic expressions for the plurality of database queries.

6. The method of claim 4, further comprising:

modifying at least one aspect of at least one table in the database; and generating a second single expression corresponding to a second plurality of database queries by applying equivalence rules for the plurality of second database queries.

7. A system comprising:

a data store comprising a set of relations;

at least one computing device in communication with the data store and comprising a processor, the processor being configured to execute a set of instructions to at least:

obtain a plurality of database queries associated with the set of relations, each of the relations comprising attributes;

prior to sending to the data store any query requests for the plurality of database queries, generate, based at least in part on applying equivalence rules using a plurality of relational operators comprising a plurality of ψ operators to algebraic expressions for the plurality of database queries and the set of relations, a single algebraic expression whose result is a global relation comprising a set of tuples, wherein the global relation is a single relation that contains all data needed to derive results for all of the database queries;

generate a single database query based on the single algebraic expression;

query the data store using only the single database query;

in response to querying the data store using only the single database query, receiving response data from the data store from which results for all of the plurality of database queries can be derived; and based on the response data, provide each tuple in the global relation to a plurality of filters to generate output relations corresponding to the plurality of database queries.

8. The system of claim 7, wherein the plurality of database queries are registered in a database management system.

9. The system of claim 7, wherein the plurality of database queries are registered to be executed concurrently.

10. The system of claim 7, wherein at least one of the plurality of database queries is associated with an algebraic expression that returns a vector of the relations.

11. The system of claim 7, wherein the single algebraic expression is associated with a global relation comprising data necessary for the plurality of database queries.

12. The system of claim 11, wherein the data does not include any attributes unless the attributes have been used in the plurality of database queries.

13. The system of claim 11, wherein there is not any row of the data that is not used by the plurality of database queries.

14. The system of claim 7, wherein the processor of the at least one computing device is further configured to at least modify at least one aspect of at least one table in the data store.

* * * * *